(12) United States Patent
Davey et al.

(10) Patent No.: US 6,357,359 B1
(45) Date of Patent: Mar. 19, 2002

(54) INTEGRATED HIGH SPEED MAGLEV SYSTEM UTILIZING AN ACTIVE LIFT

(76) Inventors: Kent R. Davey, 2275 Turnbull Bay Rd., New Symrna Beach, FL (US) 32168; Tony J. Morris, 590 Cottage Farm Dr., Marietta, GA (US) 30064

( * ) Notice: Subject to any disclaimer, the term of this patent is extended or adjusted under 35 U.S.C. 154(b) by 0 days.

(21) Appl. No.: 09/507,165

(22) Filed: Feb. 18, 2000

Related U.S. Application Data

(63) Continuation-in-part of application No. 08/493,332, filed on Jun. 23, 1995, now Pat. No. 6,044,770, which is a continuation-in-part of application No. 08/169,484, filed on Dec. 17, 1993, now abandoned, which is a continuation of application No. 07/835,156, filed on Feb. 12, 1992, now Pat. No. 5,605,100, which is a continuation-in-part of application No. 07/601,109, filed on Oct. 23, 1990, now abandoned.

(60) Provisional application No. 60/127,076, filed on Mar. 31, 1999.

(51) Int. Cl.[7] .............................................. B60L 13/04
(52) U.S. Cl. ..................... 104/282; 104/281; 104/282; 104/286; 104/283; 104/284; 310/12; 310/255
(58) Field of Search ................................ 104/281, 282, 104/286, 283, 284, 292; 310/12, 255, 254; 191/10 R, 45 R

(56) References Cited

U.S. PATENT DOCUMENTS

| | | | | |
|---|---|---|---|---|
| 5,189,961 A | * | 3/1993 | Fujie ........................... | 104/281 |
| 5,275,112 A | * | 1/1994 | Rote et al. .................. | 104/282 |
| 5,388,527 A | * | 2/1995 | Thornton .................... | 104/284 |
| 5,481,146 A | * | 1/1996 | Davey ........................ | 310/90.5 |
| 5,628,253 A | * | 5/1997 | Ozeki et al. ................. | 104/292 |

* cited by examiner

Primary Examiner—S. Joseph Morano
Assistant Examiner—Frantz F. Jules
(74) Attorney, Agent, or Firm—Levisohn, Lerner, Berger and Langsam

(57) ABSTRACT

An integrated MAGLEV (Magnetic Levitated Vehicle) system consists of permanent or preferably superconducting vehicle-mounted magnets which interact with both active and induced track-based currents. The magnets on the vehicle which are used for propulsion serve the dual purpose of realizing both levitation and lateral stabilization (guidance). The contribution offered by this invention is that it is able to provide propulsion, levitation, and guidance using a single type of track-based coil interacting with a singular type of magnetic field which is affixed to the vehicle. The realization of multiple functions with a single coil reduces the cost and enhances the efficiency of this MAGLEV system. In the main embodiment of this invention, propulsion currents are injected into brushes sliding along brush contact surfaces on the rail, series winding further eliminates the intermediate brushes leaving only the leading set of brushes and the trailing set. Motion induced currents in the coils realize both the necessary levitation and guidance forces for the vehicle. The propulsion system is a linear DC motor and requires no power handling along the track. Necessary operating power can either be carried on the vehicle or collected by a third rail pickup system. All coils in the track are supported by a reinforced recycled plastic matrix (polyvinyl fiberglass) or similar material.

20 Claims, 39 Drawing Sheets

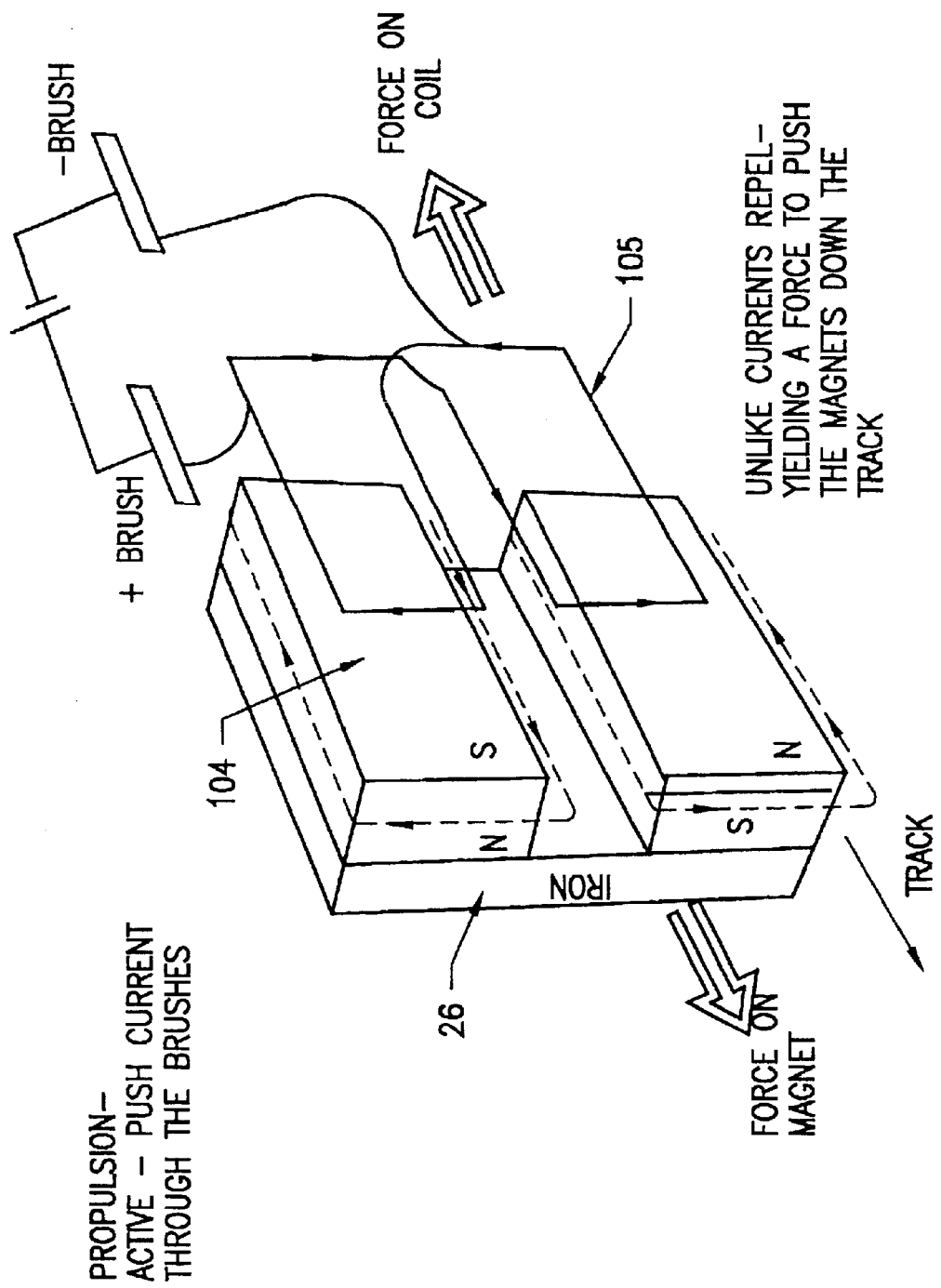

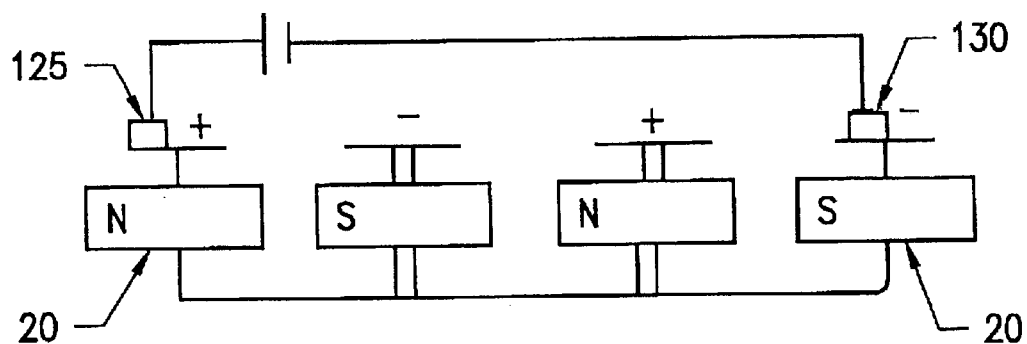
FIG. 9D
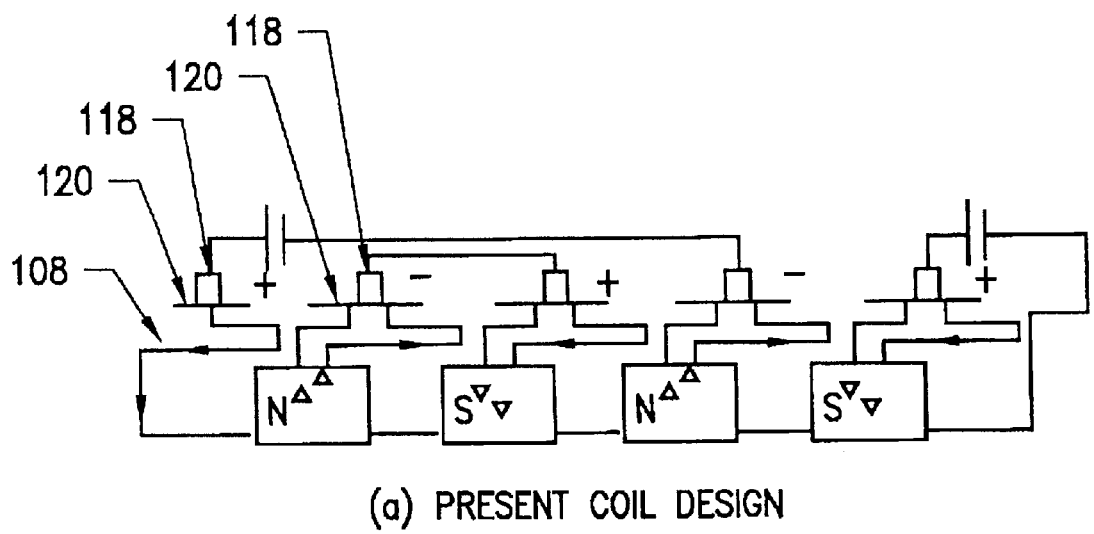
(a) PRESENT COIL DESIGN
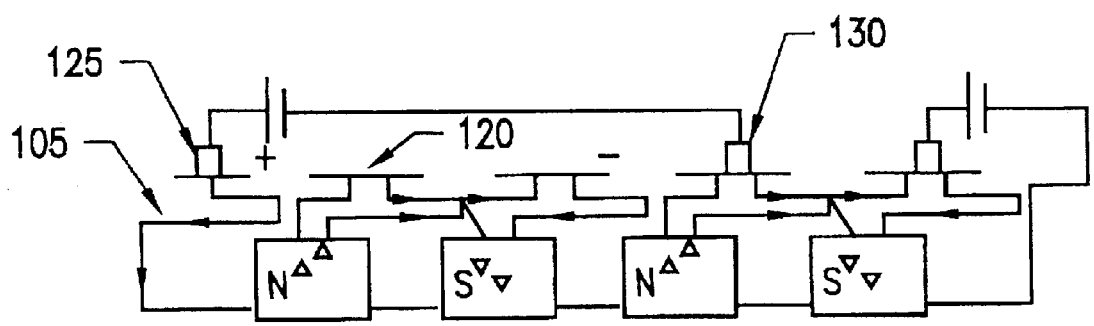
(b) PROPOSED COIL DESIGN — SWITCH EVERY OTHER COIL CONNECTION.
FIG. 9E

TABLE III DISTANCE STAGING @ 1 M/S² ACCELERATION

| STAGE | VELOCITY RANGE (M/S) | δTIME (S) | DISTANCE M | DISTANCE FT | ACCUMULATED DISTANCE FT |
|---|---|---|---|---|---|
| ACCELERATION 0-40MPH | 0-18 | 18 | 162 | 531 | 531 |
| 1ST LIFT OFF COPPER 40-80MPH | 18-36 | 18 | 486 | 1,594 | 2126 |
| LIFT OFF Al 150MPH | 36-66.96 | 30.96 | 1594 | 5,229 | 7355 (1.4 MILES) |

| Al STACKED COIL | Cu OVERLAPPED COMPOSITE | Al OVERLAPPED COMPOSITE |
|---|---|---|
| 100m | 300m | 1/4 MILE |

(a) SINGLE GUIDEWAY COIL 1 MOVING PAST A VEHICLE COIL

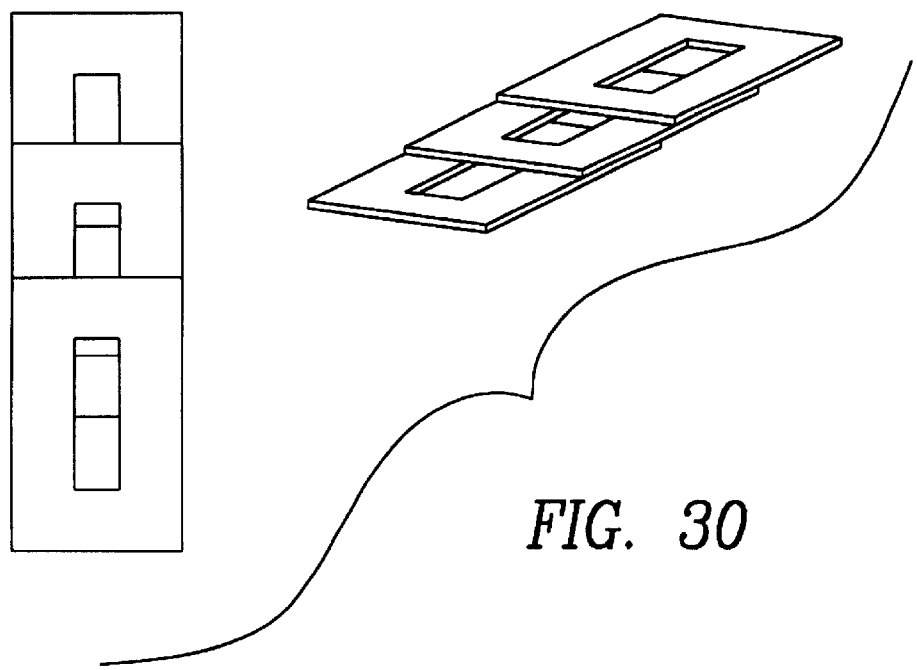
FIG. 30
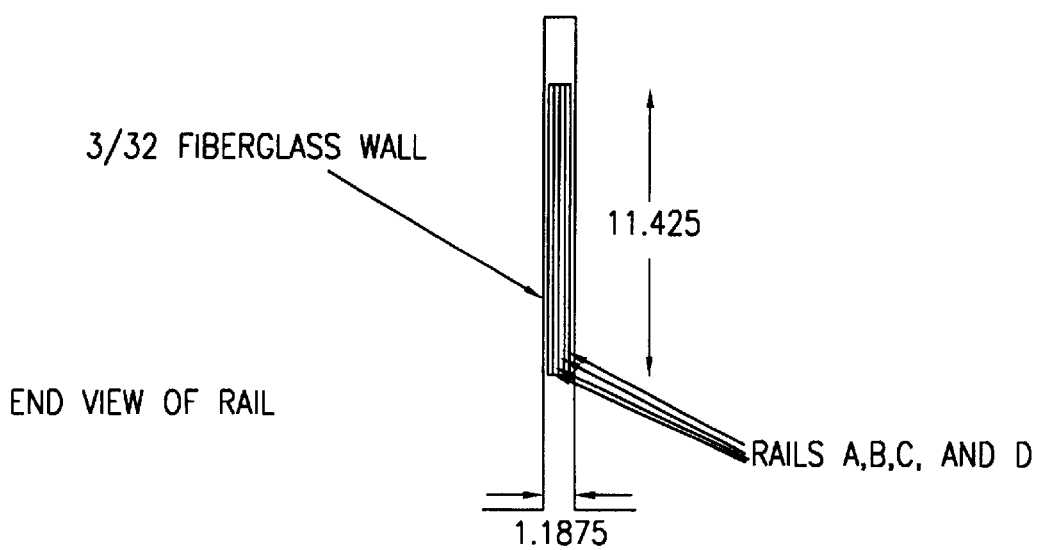
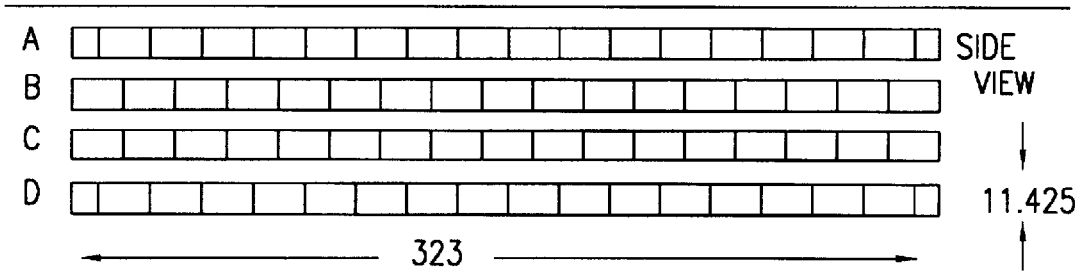
FIG. 31

INTEGRATED HIGH SPEED MAGLEV SYSTEM UTILIZING AN ACTIVE LIFT

RELATED APPLICATIONS

This application is a continuation-in-part of U.S. patent application Ser. No. 08/493,332, filed Jun. 23, 1995 now U.S. Pat. No. 6,044,770, which is a continuation-in-part of patent application Ser. No. 08/169,484, filed Dec. 17, 1993 now abandoned, which is a continuation of patent application Ser. No. 07/835,156 filed Feb. 12, 1992, now U.S. Pat. No. 5,605,100 which is a continuation-in-part of patent application Ser. No. 07/601,109 filed Oct. 23, 1990, now abandoned. This application also claims the priority of U.S. Provisional Application Serial No. 60/127,076, filed Mar. 31, 1999.

BACKGROUND OF THE INVENTION

This invention relates to the complete construction and design of a high or low speed MAGLEV (Magnetic Levitated Vehicle) system. Of central concern is the means by which propulsion, levitation and stabilization forces are provided to the vehicle.

Design Requirements of a MAGLEV System

Unlike the design of many conventional electric motors, a MAGLEV system must be sensitive to the fact that one side of the motor, either the rotor or the stator, is nearly infinite in length. Thus, the components, and the cost of the track in particular, is a much greater concern than is usually the case with a conventional motor, in which both the rotor and stator are comparatively small and of finite length.

Most high speed MAGLEV vehicles are projected to run at speeds of about 150–300 mph. Not only is the aerodynamic drag a key factor in the design of the vehicle, but magnetic drag is as well. The term magnetic drag refers to the forces exerted on the vehicle by eddy currents induced in the track acting against vehicle-based magnets. At low speeds in the neighborhood of 30 mph, this drag can constitute up to 200 to 300 per cent of the total drag, while at 300 mph it might constitute 5 per cent of the total drag. Magnetic drag should be minimized, whenever possible.

Of equal importance to the design of a MAGLEV vehicle is the issue of how levitation and stabilization will be achieved. By way of comparison, all commercial aircraft land at speeds less than 170 mph since the landing wheels can not withstand impact at higher speeds. Whatever mechanism is used to achieve the levitation and stabilization of a MAGLEV vehicle, it must be guaranteed to be fail-safe when a local power substation goes down. Similarly, it cannot depend on one or two superconducting magnets which have the possibility of quenching at any time. Lastly, there must a mechanism for transferring both propulsion power and service power (lighting, heating, air-conditioning, etc.) to the vehicle.

In summary, the targeted objectives for an efficient and viable MAGLEV system are as follows:

1. A low cost track. This is the element of the system which will constitute the greatest component of its costs.
2. Means for reducing unwanted eddy currents with their commensurate heating loss and magnetic drag.
3. Means for realizing efficient levitation and stabilization in a fail-safe mode. This means should be able to realize such levitation and stabilization at both high and low speeds—preferably without incurring undue additional cost to the system.
4. Means for delivering propulsion and service power to the vehicle.

Background Work

The background work in this area is quite extensive. Among the earliest patents proposed for a MAGLEV system is that by Maurice F. Jones and Lee A. Kilgore, U.S. Pat. No. 2,412,512 (1946). Their proposed system consisted of a laminated polyphased wound core in the vehicle which acted against a squirrel cage current rail extending the length of the track. This patent shares some features with that of Millard Smith and Marion Roberts, U.S. Pat. No. 3,233,559 (1966), which also proposed a linear electric induction motor as a means of propelling a vehicle down the track. Both suggestions suffer the problem of getting a large amount of power into the vehicle; this task might be possible at present using state of the art brushes. With the proposed squirrel cage arrangement, operation would not be possible without considerable magnetic drag loss. Frank Godsey and Maraca Jones, U.S. Pat. No. 2,666,879 (1954), suggest a similar configuration, but mount the windings along the length of the track; the vehicle need only carry a conducting sheet which would be sandwiched between these windings. The cost of such a MAGLEV configuration might be astronomical.

More recently, additional systems have been suggested which attempt to realize propulsion using linear synchronous motors. More notable among this group is the patent by Naoki Maki, et al, U.S. Pat. No. 3,913,493 (October 1975). Their system uses a linear synchronous motor in which track-based three phase coils interact with a vehicle-based magnetic coil group to realize the propulsion. Again, the cost of such a system could be extremely high.

Among the first groups to suggest an integrated system yielding levitational guidance and propulsion was that by Richard Thornton, U.S. Pat. No. 3,850,109 (November 1974). The vehicle was constructed with a number of long, thin superconducting coils which, when energized, would interact with "I" strips along the guideway to effect levitation. Propulsion was accomplished by interaction with other vehicle coils reacting with an armature based winding in the track. Although such a system would indeed realize levitation at very low speeds, along with propulsion, the cost could be very large. Moreover, if either of the two lift coils suffered a superconducting quench, catastrophic results would no doubt ensue.

In what might be summed up as possibly the most expensive MAGLEV system ever proposed, Ushio Kawabe and Hiroshi Kimura (U.S. Pat. No. 3,662,689 (May 1972)) suggest the use of a hard superconductor which is laid out along the length of the track and flooded with superconducting fluid. The superconductor would react against a vehicle-based magnet to induce eddy currents realizing both the levitation and stabilization. The superconductor was arranged in a box-like configuration underneath the vehicle. Also laid along the length of the track was a ladder structure. Current would be impressed from one side of the ladder, laid horizontally along the ground, to the other side of the ladder. A propulsion force would then be generated as a consequence of the interaction of the vehicle-based magnetic field with the current in this ladder using conventional Lorentz forces, i.e. $\vec{J} \times \vec{B}$. If one examines FIG. 5 of that patent more closely, it will become apparent that the superconducting magnet in the track underneath the solenoidal magnet is used to generate the propulsion/lift field in the vehicle. The interaction of the two fields will actually cause the magnetic field to be horizontally directed in the plane of the ladder. The $\vec{J} \times \vec{B}$ forces realized would be very small indeed. This parenthetical note is important because the propulsion forces realized by the present system are not unlike those which Kawabe was attempting to realize, but had failed to. In any event, the cost of his levitation system seems hopelessly unrealistic.

Kazumi Matsui, et al., in U.S. Pat. No. 3,771,033 (November 1973), and U.S. Pat. No. 3,904,941, (September 1975), outline a means for generating propulsion forces for a MAGLEV system using current conductors in a picket fence type arrangement in the presence of a homogenous field. These patents deserve mention because the propulsion system used in the present invention also incorporates currents passing through a picket fence arrangement of conductors lying within a homogenous field. The arrangement proposed however by Matsui is quite inefficient. Over the span of a single permanent magnet field, multiply directed currents are injected into these conductors in both directions to yield $\vec{J} \times \vec{B}$ forces which are counterproductive. The proposed system overcomes this drawback and maintains a higher efficiency by allowing currents of like direction only to contribute over a common pole face of a vehicle-based magnet.

The last patent that will be mentioned in reference to mechanisms for generating propulsion forces is that of Osamu Shibuka, et al, U.S. Pat. No. 4,641,065 (February 1987). Their track consists of a rail of north-south magnets directing their flux in a predominately horizontal direction with the ground. A conducting rail of U-shaped cross-section fits around the magnets and is provided with a set of brushes for changing the direction of the current within a moving U-shaped coil. The brushes pick up current from the stationary feed line; the current interacts with the magnet field to generate the propulsion forces.

That system of propulsion is similar to one of the two embodiments used in the present invention for generating propulsion forces. The differences are quite important, however. Unlike Shibuka, the conductors in the present system are always fixed; the magnets are mounted on the vehicle to reduce the cost of the track. Secondly, the coil used in the present invention serves a multiplicity of roles and is itself a collection of four subcoils. They are never configured with a U-shaped cross section as is explicitly required in Shibuka's patent. These alterations and differences allow for a sizeable cost reduction of the system.

In addition to achieving the propulsion forces necessary for the vehicle, it is necessary to guarantee stabilized levitation. Almost all systems require a separate assembly of magnets or superconducting coils to achieve the levitation. For example, the 20 year old German Transrapid system has been using an attractive magnetic floater type arrangement similar to the one proposed by Sakae Yamamura, et al, U.S. Pat. No. 4,646,651 (March 1987). Generally, a piece of steel is run under the guideway of the track and an active electromagnet interacts with that piece of steel to maintain the gap at a specified setting. It is necessary in these arrangements for the vehicle to wrap around the track support structure to achieve an attractive support from below. The aerodynamic losses associated with wrapping the structure, however, are large. In addition, the track support structure must have a T-shaped cross section—yet, additional cost penalties are incurred with such a design. By contrast, the suspension and guidance system used in the present invention induces the necessary levitation and stabilization forces.

Among the first to propose the use of null flux coils in electromagnetic inductive suspension systems was J. R. Powell, U.S. Pat. No. 3,470,828 (October 1969). In actuality his proposed scheme used null flux coils to realize lateral side-to-side stabilization and isolated vertically oriented coils for the levitation forces. As the vehicle-based magnets are moved vertically with respect to these outboard coils affixed to the track, additional flux is induced in the coil to generate vertical restoring forces. A rather significant problem facing all MAGLEV designers is the issue of high speed magnetic drag. The currents induced in the vertical leviation coils do indeed yield the currents necessary to produce lift on the vehicle. Commensurate with this lift, however, is a sizable drag on the vehicle. By properly choosing the size of the null flux coils used in the Powell patent for stabilization, a large percentage of that drag can be eliminated. Well designed null flux coils have been shown to yield up to a 200 to 1 lift to drag ratio.

There are two patents by Shunsuke Fujiwara, U.S. Pat. No. 4,779,538 (October 1988) and U.S. Pat. No. 4,913,059 (April 1990) which utilize null flux coils for both levitation and stabilization. In both patents, the vehicle runs down a long boxlike trough. Null flux coils are arranged along the vertical side walls of the trough to provide the levitation forces needed by the vehicle. The superconducting magnet is mounted on the vehicle and is in an orientation which drives flux horizontally through the vertical mounted null flux coils. Any displacement from the baseline equilibrium position induces currents in the coils, with commensurate forces which act to realign the magnets with respect to the null flux coils. An important part of those systems was the use of connections from the left wall of the track to the right wall of the track. By connecting the two sets of null flux coils on either side of the vehicle, it is possible to realize higher lateral side-to-side stabilization forces. Their final arrangement consisted of two sets of null flux coils, each set being arranged on either side of the vertical walls of the vehicle. The two sets are themselves joined together by connections across the track to realize a higher efficiency in side to side restorative stabilization. The aerodynamic losses associated with the vehicle running down such a contorted track, however, would be significant. Moreover, the cross connections of these null flux coils constitute a considerable additional cost in construction, since the coils must pass within or below the structure of the guideway.

By way of completeness it should be mentioned that inductive systems which do not use null flux coils have also been recommended. One such system is that of Jurgen Miericke, U.S. Pat. No. 3,834,317 (September 1974). Induction is the only principle used in this patent to realize both the vertical and horizontal restoring forces. Track-based coils induce currents in conducting plates which are arranged both vertically and horizontally down the length of the track. The drawback of that design is the presence of larger drag forces accompanying the lift.

Other Systems Using Null Flux Coils

Because the present invention employs a flux elimination principle similar to that of governing null flux coils, it is appropriate to refer to alternative systems that involve the null flux coil.

The following represents an extension of work which was presented at the IEEE Magnetics Conference-INTERMAG 95 (Apr. 18–25, 1995 San Antonio, Tex., p.AT-09). FIG. 1 shows a vehicle 1 riding on two vertical rails 2 which are supported by a guideway structure 3 which is typically made of concrete based bulb "T"'s. The vertical track consists of castellated conducting members 8 and null flux coils 9. The vehicle has two types of magnets in it. The first is a transverse magnetic source 11 which drives flux across the vertical rail. The second set type are repulsive magnets 12 which have no flux being driven through the rail at its center plane.

A closer view of the rail structure 2 is shown in FIG. 2. The current injected into the castellated members 8 provides the propulsion current for the vehicle. It is returned at cross-over points 10 to the adjacent rail. As the transverse magnets 11 translate past the null flux coils 9, currents are induced in the null flux coil as depicted in FIG. 3. These currents interact with vehicle-based transverse magnetic sources to yield high lift forces and small drag forces.

An alternative to using a castellated track is the series of "T" conductors shown in FIG. 4. Here the propulsion currents are driven into a brush contact surface 17. The currents are forced down these "T" shaped conductors each of which is insulated from its neighbor by an insulated spacer 18. The use of brushes and a brush contact surface greatly reduces the power handling problems and cost along the MAGLEV track.

FIGS. 1–4 have been detailed to illustrate major problems commensurate with the use of null flux coil topology. Among the disadvantages associated with that system are the following:

1. Two types of magnetic field sources are necessary on the vehicle. The repulsive magnetic field source 12 serves only to generate guidance or lateral stabilization for the vehicle, but constitutes an additional weight burden, as far as lift and propulsion is concerned.

2. The system requires two types of conductors or coils in the track. The castellated conductors 8 or the "T" conductor 17 serves the role of providing propulsion for the vehicle. The "figure eight" coils serve the role of providing currents which are passively induced to yield levitation and guidance. From a construction and cost perspective, it would be more advantageous if a single coil could serve all three roles.

3. The flux path associated with the use of transverse magnets 11 is not conducive to a light weight vehicle. The pole face area required for sufficient operation of such a system is quite large, being at a minimum 2–3 ft². A properly designed magnetic flux path requires a relatively large cross-sectional area of back iron to complete its path over to the next pole face. This type of magnetic field source is described as a dipole. The field falls off as the reciprocal distance cubed away from the dipole. Thus, it constitutes a secondary disadvantage in that shielding in the passenger compartment becomes somewhat problematic. It would be more beneficial if the magnetic fields were a quadrapole or octapole type field which falls off much more rapidly away from the source.

4. The castellated track approach requires the power to be injected into the rail from the wayside. The current must be injected with the proper phase with respect to the vehicle position; therefore, such an approach requires the use of transducers and complex power handling. The use of brushes and contact surfaces eliminates this complication and reduces the complexity of the system. Thus, the variant brush surface 17 which allows for current injection via brushes (as depicted in FIG. 4) offers a considerable advantage which should be retained if at all possible in the present invention.

SUMMARY OF THE INVENTION

These and other problems and disadvantages associated with the prior art are to a large extent overcome by the invention disclosed herein. The driving motivations behind the invention are the items listed in the previous section, those being to minimize the cost of the track, to realize levitation and stabilization in a fail-safe, cost-effective manner, to eliminate eddy current losses which produce additional magnetic drag, and to realize a means for delivering the power for propulsion and secondary service to the vehicle.

The basic embodiment of this invention is shown in FIG. 5a. It utilizes a vehicle 101 which moves over a track having two vertical rails 102. The track is supported by a guideway structure 103. Extending from the vehicle 101 are magnetic sources 104 which are configured to flank each of the vertical rails 102. The rais 102 house coils 105. Thus, as depicted in FIGS. 5a–c, as the vehicle 10 travels along the track, magnetic sources 104 extend downward from the vehicle 101, each source flanking one of the vertical rails 102 and, of course, flanking the composite coil 105 housed within it.

The first departure from the conventional prior art is to employ vertically stacked magnets as the magnetic source in this design, with dissimilar magnetic pole faces one on top of the other. Using vertically stacked magnets accomplishes two objectives. First, it eliminates the return flux from transverse magnet 11 which formerly travelled axially down the track in FIG. 1. Second, it contains the flux more effectively over the height of the vertical rail, and thus eases the difficulty of shielding.

With this configuration of magnets, the use of null flux coils will no longer be suitable to passively generate levitation forces for the vehicle. A new type of coil must be employed for this purpose, a coil which is, in fact, a composite collection of subcoils and thus will be referred to as the composite coil. This composite coil consists of four smaller coils which are connected in parallel as shown in FIGS. 8a and 9a. Propulsion is realized in a manner likened to that depicted in FIG. 4 by brushes which inject current into the parallel connection points of the composite coil. The closed electrical circuit created by the parallel connection of the subcoils will have currents induced in it as magnets are translated past it. As will be apparent to one of ordinary skill in the art, proper placement of these coils with respect to the magnetic field source generates both levitation and guidance forces passively. Lower resistance coils with higher L/R ratios yield greater lift at lower speeds.

The stacked magnets have a sizable leakage flux from the upper magnet to the lower. As the composite coil is laterally displaced so that it becomes closer to the magnetic field sources on the left side of the vehicle with respect to the right, currents will be induced in the composite coil due to this leakage flux which acts to generate forces which re-center the composite coil.

Because the guidance and lift forces are realized by eddy currents which are induced by the translation of magnets or a magnetic source past the coil, no lift or guidance is realized at low speeds (i.e., less than 30 MPH). Thus, an alternative means for generating both levitation and guidance must be sought. The simplest and most cost-efficient solution is to simply use wheels affixed to the vehicle. These wheels conceptionally mount within the outer frame of the vehicle and project only slightly past the outer skin. Alternatively, they can be retracted as with conventional aircraft vehicles. This type of eddy current induced lift is similar to that obtained with conventional null flux coils; both return a relatively high Lift/Drag ratio, except at very low speeds. There is a speed at which the drag peak is large (approximately 20 MPH). It is advisable to operate the vehicle at low speeds at the so called null flux point, the height at which the magnetic field sources induce no currents in the composite coil. The guideway can be constructed so that at speeds in excess of the maximum drag speed point, the guideway structure would be lowered with respect to the midline of the composite coils allowing the vehicle to induce currents and provide lift for itself. Horizontally directed wheels braced against the guideway substructure or the rail are necessary to provide for lateral guidance at low speeds. They too can be withdrawn as the vehicle speed increases and becomes adequate to provide for its own stabilization. A more costly alternative to using wheels to realize levitation at low speeds is to insert an additional coil in the vehicle into which current is injected via the brushes to provide additional lift as currents interact with the same magnets in the vehicle.

Among the advantages realized by this system are the following:

1. One composite coil effects the three functions of propulsion, levitation, and guidance.

2. The stacked magnet design lends itself to an efficient low reluctance path and eases requirements placed on magnetic shielding of the passenger compartment.

3. No cross connections of the composite coils from rail to rail are required, in contrast to Fujiwara U.S. Pat. No. 4,913,059 (April 1990).

4. The system lends itself to the use of brushes and contact surfaces, which eliminates the need for power circuitry handling along the track and complex position sensing equipment.

An assessment of how well the targeted objectives outlined in the design requirements of this invention have been realized serve as a fitting conclusion to this summary.

The first objective was that of a low cost track. By using passive coils impregnated in a recycled plastic matrix in the track, the cost is indeed minimal because the track is passive, and the requirement of periodic power handling along the length of the track is eliminated.

The second objective was to reduce unwanted eddy currents, and the heating and magnetic drag which they cause. From field theory arguments, it is possible to show that if copper wire is used to wind the coils, each strand of which is no larger than 0.13" in diameter, the eddy current heating loss can be kept to less than 10% of the $I^2R$ losses commensurate with propulsion.

The third requirement was an efficient means for generating lift and stabilization. The null flux like composite coils deliver levitation and guidance passively by induction, and can theoretically deliver high lift to drag ratios. Because this lift and guidance is being generated by a coil that is also used for propulsion, an overlap with the objective of having a low cost track is achieved.

The final requirement involved power delivery to the vehicle and to the track. By using a brush current injection, the need for position sensors along the track is eliminated as well as the required complex multi-frequency power handling along the track. Getting the power into the vehicle is usually achieved using a third rail pickup system or alternatively, with onboard generation equipment.

BRIEF DESCRIPTION OF THE DRAWINGS

FIG. 8b is a partial schematic demonstrating the generation of propulsion forces by the interaction of the magnetic source and the coil.

FIG. 9d is a simplified plan view of a recommended series connection of the brushes.

FIG. 9e(a) is a plan view of a design for a brush system which utilizes leading, trailing and intermediate brushes.

FIG. 9e(b) is a plan view of an improved design for a brush system in which switching the connections of certain composite coils to the brush collector plates results in a series connected brush system using only leading and trailing brushes, and eliminating the need for intermediate brushes.

FIG. 30 is the perspective view of the coil arrangement where coils are staggered in two phases, one phase being advanced longitudinally with respect to the other phase.

FIG. 31 is a schematic diagram of the fill rail composed of multiple clusters of coils aligned at the end.

DETAILED DESCRIPTION OF THE INVENTION

Figure 5B:
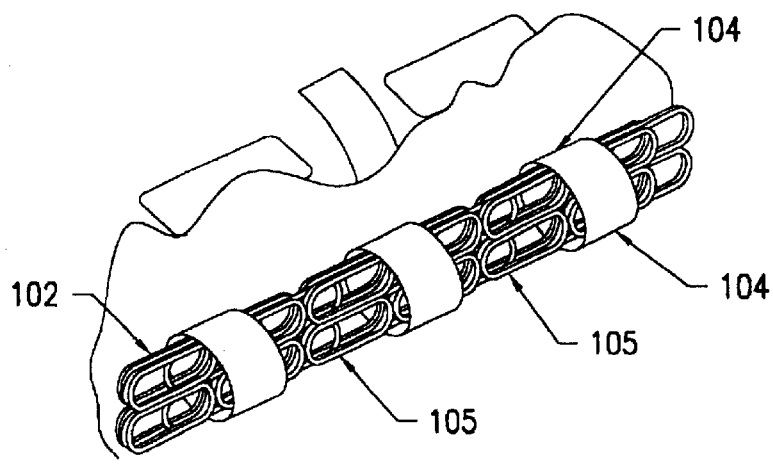
FIG. 5b is an enlarged perspective view of the vertical rail, showing the magnets flanking the rail and the composite coils housed within the rail.
Figure 5A:
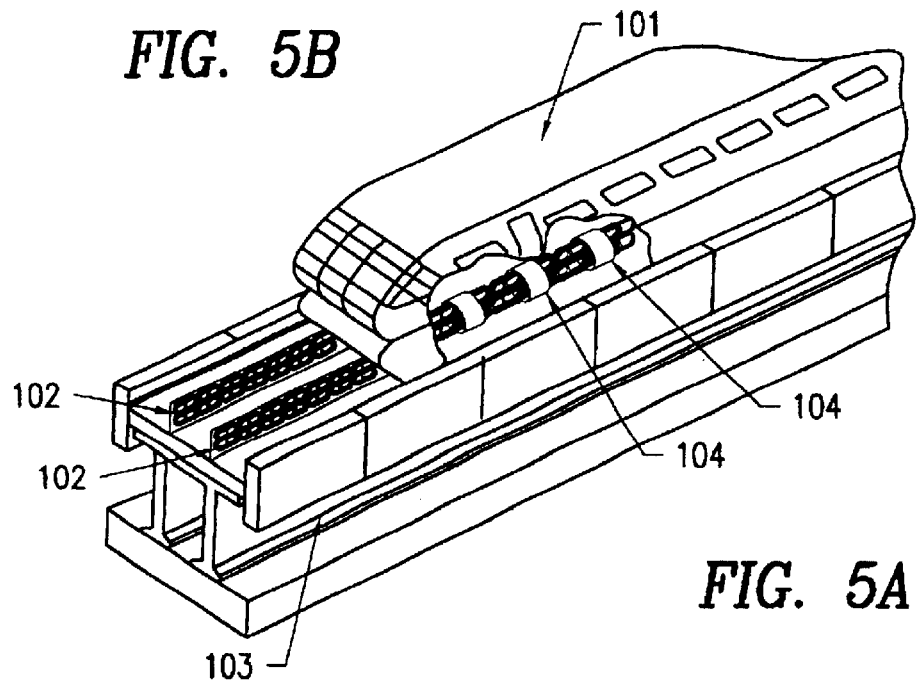
FIG. 5a is a partial perspective view of a MAGLEV vehicle of the present invention, showing the vehicle riding on a track, with the magnetic source extending from the vehicle to flank a vertical rail.
Figure 5C:
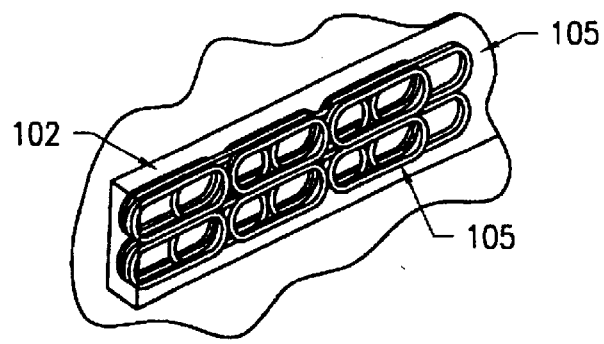
FIG. 5c is an enlarged perspective view of the vertical rail showing the composite coils housed within.

As described above, the basic embodiment of this invention is shown in FIG. 5a. The preferred embodiment utilizes a vehicle 101 which moves over a track having two vertical rails 102. The number of rails can, of course, be modified, if desired. The track is supported by a guideway structure 103, typically made of a concrete based material. Extending from the vehicle 101 are magnetic sources 104 which are configured to flank each of the vertical rails 102. The rails house coils as shown in FIGS. 5a–c. Thus, as depicted in FIGS. 5a–c, as the vehicle 101 travels along the track, magnetic sources extend downward from the vehicle 101, each source flanking one of the vertical rails 102 and, of course, flanking the composite coil 105 housed within it.

Current is provided to the composite coil, typically using a brush injection system. The magnetic field sources and the composite coil interact to provide propulsion, levitation, and guidance forces to the vehicle. In contrast to the prior art, the present system allows these forces to be generated and induced using a single type of coil, and a single type of magnetic source. The advantages of this design, are therefore quite significant.

Figure 6A:
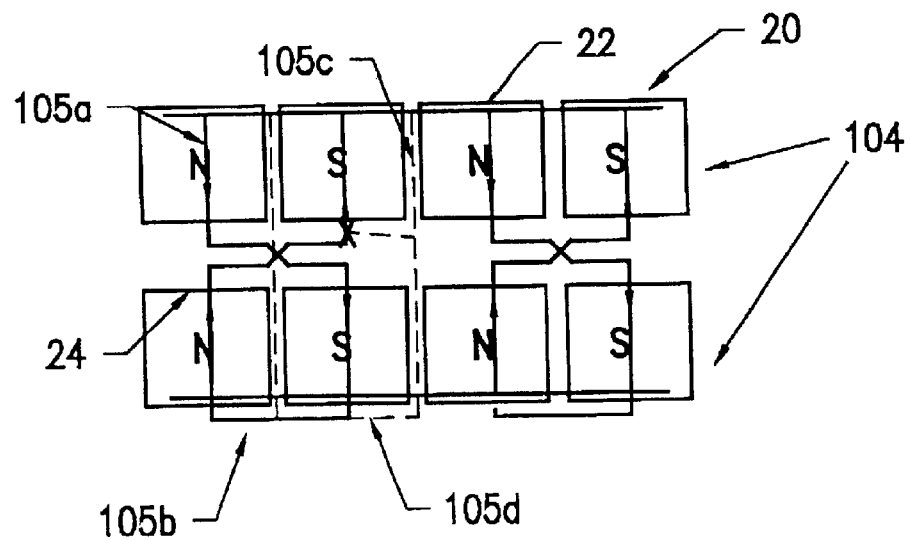
FIG. 6a is a schematic representation of the stacked magnet design of the present invention.

A major departure from prior art designs as detailed in the Background of the Invention, is the use of stacked magnets 20, as depicted in FIG. 6a, as the magnetic field source 104. With the magnets stacked reversing in polarity as shown, it is necessary to reverse the currents in the coils, as well. This is achieved by "stacking" the subcoils of the composite coil 105 as shown in FIG. 6a. Current injected into the stacked coils 24 generates the necessary propulsion currents for the vehicle.

As shown in greater detail in FIG. 6a, in the preferred embodiment the composite coil arrangement of four subcoils has a half coil (represented by the solid line) of two stacked subcoils (105a and 105b) placed in a first vertical plane closer to one side of the rail, and a half coil (represented by the dashed line) of two stacked subcoils (105c and 105d) in a second vertical plane closer to the opposite side of the rail. (The depiction of this arrangement of the half coils into two parallel planes is presented in a perspective view within FIG. 6a.) These four subcoils (composed of two planes of two subcoils each) are all connected in parallel to form a single composite coil. As described in greater detail below, a single rail will have composite coils extending down the length of the rail, and multiple composite coils across the rail's width. The composite coils are electrically connected together in series down the length of the rail, while the four subcoils of each composite coil are connected in parallel.

As further depicted in FIG. 6a, a brush contact surface 22 is provided just above the magnets. Brushes will ride upon the brush contact surface, and move along that surface with the motion of the vehicle. These brushes inject current into the coil, providing the current for propulsion.

Figure 6B:
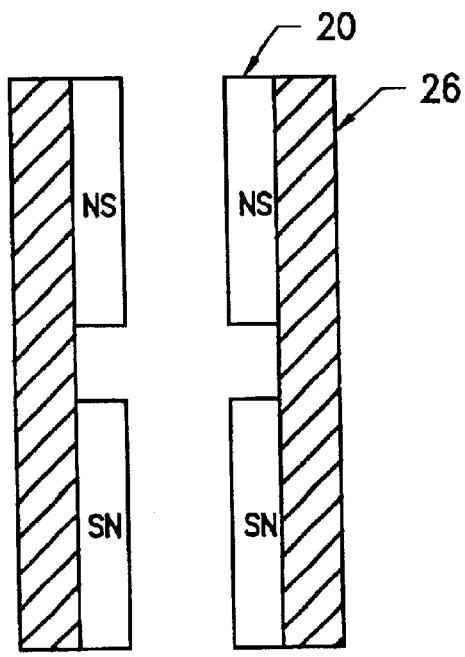
FIG. 6b is a vertical cross-sectional view of the stacked magnet design.

A side view of the magnets employed in this geometry is shown in FIG. 6b. The figure displays the vertical downward extension of the magnetic source from the MAGLEV vehicle. The vehicle itself is not expressly shown in this figure; however, the figure should be considered in conjunction with FIG. 5.

As shown in FIG. 6b, the magnets of the magnetic source are vertically stacked with dissimilar magnetic pole faces one on top of the other so that adjacent magnetic pole faces are opposite in polarity. The use of vertically stacked magnets eliminates the return flux from the transverse magnet configurations of prior designs (which return flux formerly travelled axially down the track), and more effectively contains the magnetic flux over the height of the rail, thereby easing the difficulties of shielding. In the preferred embodiment of the present invention, the stacked magnets 20 are fixed to back iron 26, as shown in FIG. 6b, to lower the reluctance of the return magnetic path. The height of this structure is approximately 15".

Figure 7:
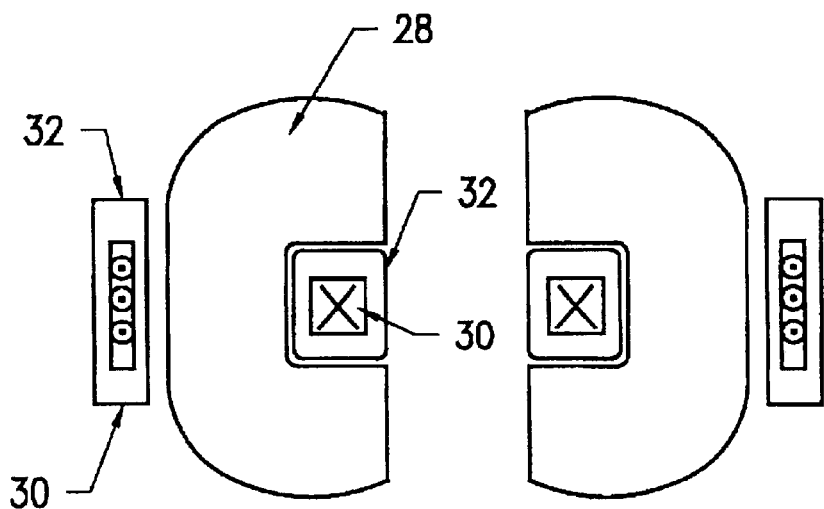
FIG. 7 is a vertical cross-sectional view of the stacked superconducting electromagnet design of an alternate embodiment.
Figure 39:
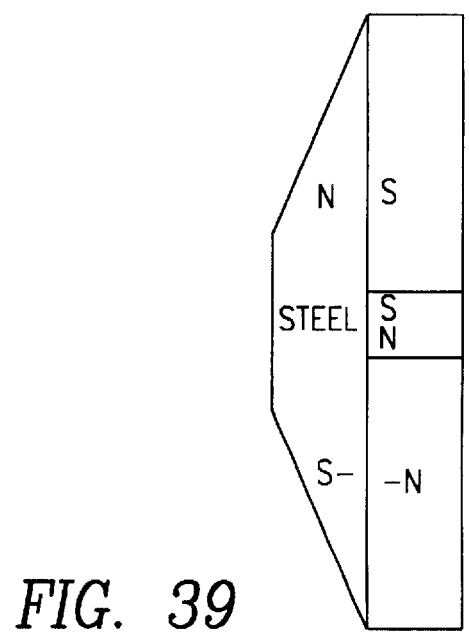
FIG. 39 is a schematic diagram of an alternative embodiment of the stacked magnets which may be employed with the present invention.

An alternative to the use of conventional magnets is that shown in FIG. 7. As shown in cross-section in this figure, an iron core 28 is wrapped with superconducting wire 30 to produce the magnets of the magnetic source, the wire itself being enclosed by a helium dewar 32. Although the example shown is one possible configuration, numerous other arrangements using superconducting materials will, of course, be apparent to those skilled in the art. Another alternative embodiment of the stacked magnets which may be employed by the present invention is shown in FIG. 39.

Figure 8A:
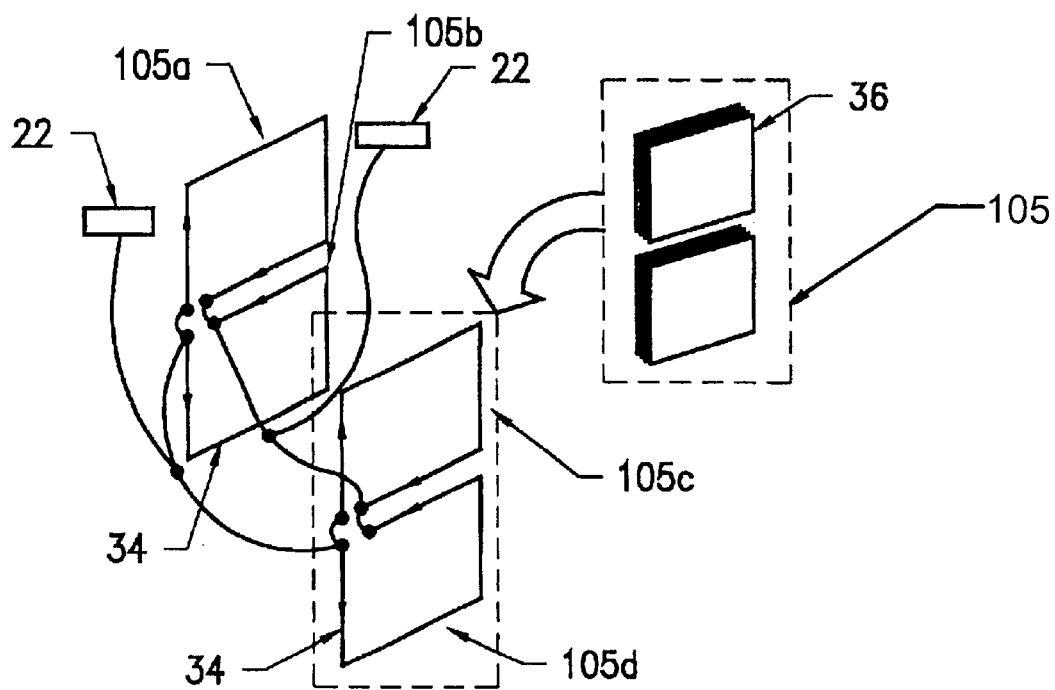
FIG. 8a is a schematic of the composite coil, showing connection of four multi-turn subcoils to form a single composite coil which is used to produce propulsion, lift and guidance.

FIG. 8a shows a view of the composite coil which serves the triple role of providing propulsion, levitation, and guidance. The composite coil 105 is comprised of four subcoils 105a–d, arranged in two planes 36 of two subcoils per plane. The subcoils are connected in parallel with brush leads also being soldered into the same connection points. The arrows on the subcoils in FIG. 8a (not the lead lines) depict the direction of current flow for propulsion only. Additional currents will be induced in these coils depending on their position and speed relative to the magnets in the vehicle. It is these induced currents that produce the levitation and guidance forces acting on the vehicle. (The current flow for levitation and guidance is depicted in FIGS. 8c and 8d.)

Figure 8C:
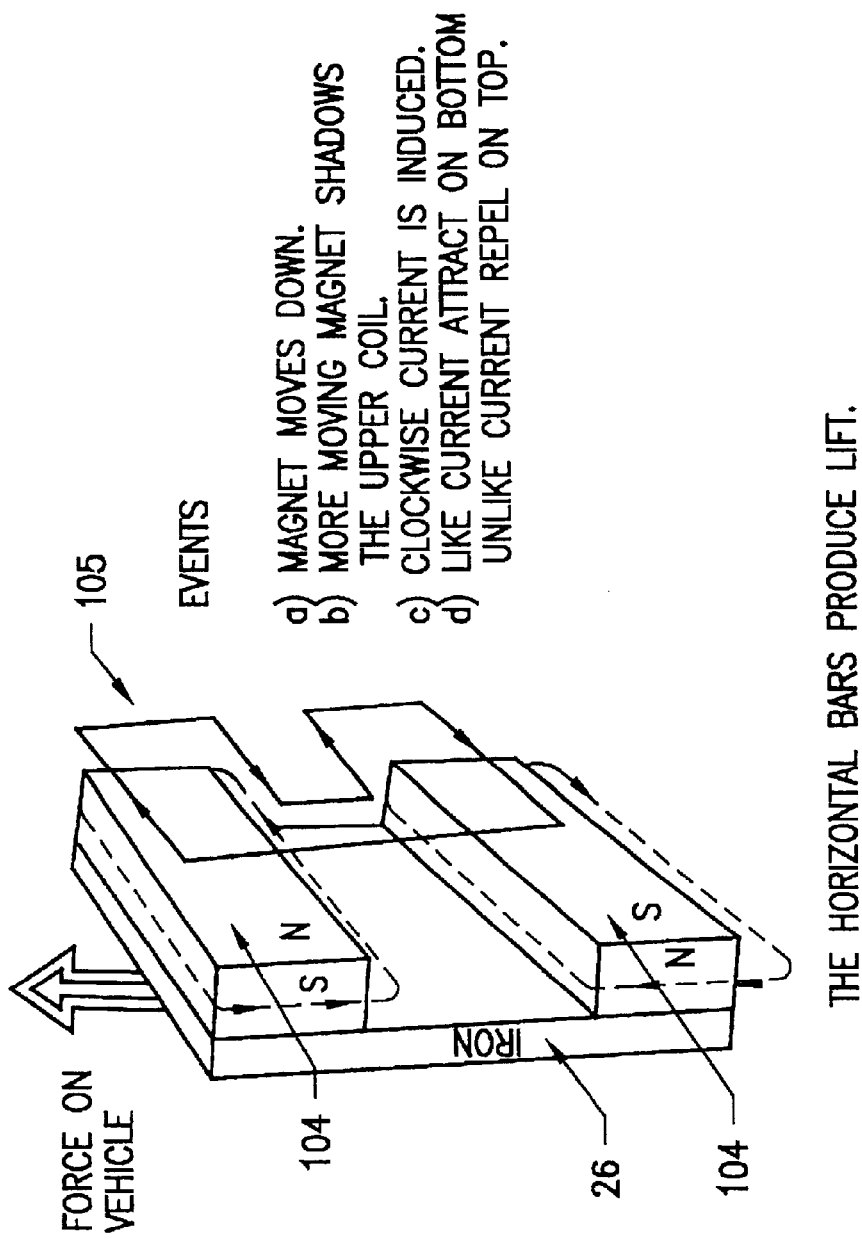
FIG. 8c is a partial schematic demonstrating the inducement of lift forces by the interaction of the magnetic source and the coil.
Figure 8D:
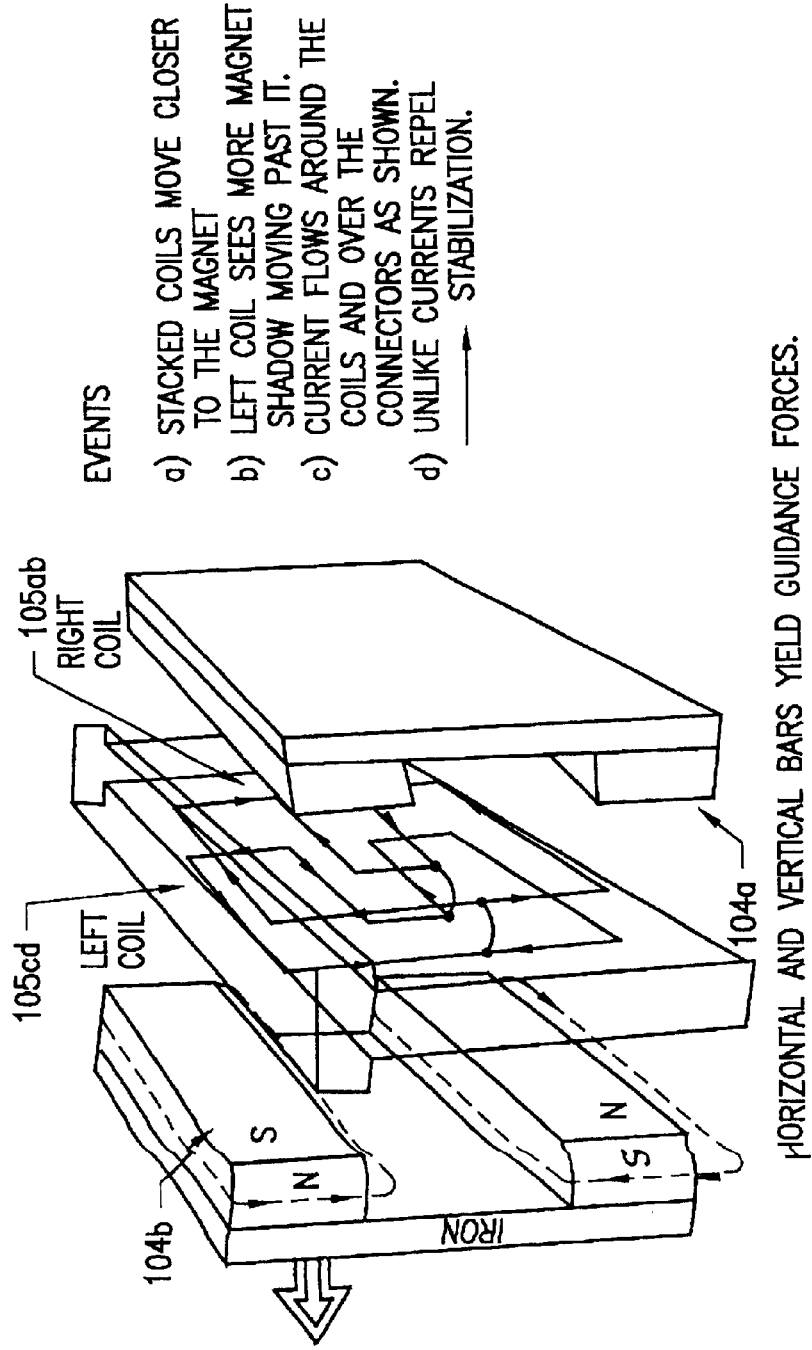
FIG. 8d is a partial schematic demonstrating the inducement of guidance forces by the interaction of the magnetic source and the coil.

The propulsion, levitation, and guidance forces which result from the interaction of the coils and the magnetic sources are shown in greater detail in FIGS. 8b through 8d.

The generation of propulsion forces is shown in FIG. 8b. As depicted therein, the magnets of magnetic field source 104 are fixed to backiron 26, and flank composite coil 105. (Only half the magnetic source 104 and composite coil 105 are shown.) Brushes are utilized to deliver current to the composite coil 105. Injection of current into the composite coil 105 in the direction shown by the arrows actively produces a magnetic field around the coil, resulting in repulsion between the coil and the magnetic field source, propelling the magnetic source (and the vehicle affixed thereto) down the track. Or, stated in another manner, as shown in the figure, unlike currents repel, yielding the propulsion force.

The interaction of the magnetic field source and the composite coil to produce lift is shown in FIG. 8c. As depicted therein, lift is passively induced by the interaction of the magnetic source and the coil, in contrast to the active generation of propulsion forces shown above. The magnets of magnetic field source 104 are affixed to backiron 26, and flank composite coil 105. (Only half of the magnetic source 104 and composite coil 105 are shown.) As the magnets move downward under the weight of the vehicle, the moving magnet shadows the upper portion of the composite coil 105 inducing a current in the coil 105, as shown by the arrows on the coil in FIG. 8c. The current in the coil results in a magnetic field producing a lift force on the magnetic source. Or, stated in another manner, as shown in the figure, like currents attract on bottom and unlike currents repel on top, producing the vertical lift force.

Figure 40:
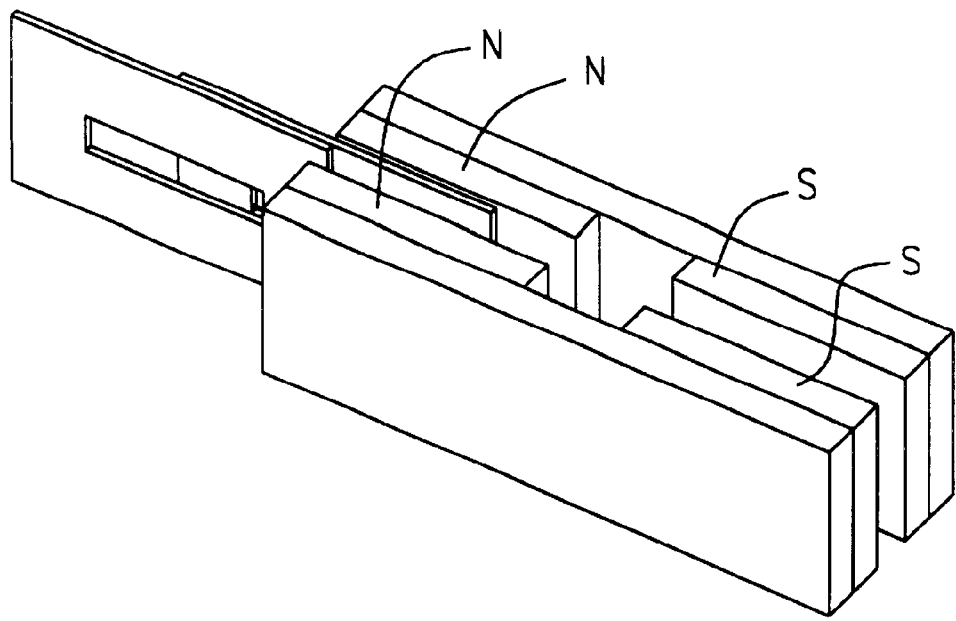
FIG. 40 is a perspective view of the guidance magnets opposing one another and linking no flux with a centered coil.

The guidance forces on the vehicle are depicted in FIG. 8d. Like the lift forces, guidance is passively induced. The magnets of magnetic field source 104 (i.e. 104a and 104b) flank composite coil 105 (i.e. half coils 105ab and 105cd), with the right half 104a of magnetic source 104 adjacent to the right half-coil 105ab of composite coil 105, and the left half 104b of magnetic field source 104 adjacent to the left half-coil 105cd of composite coil 105. The rail is intended to be centered between the two halves 104a and 104b of magnetic source 104. Looking at the left half 104b of the magnetic source for illustration purposes, movement of that half or side closer to the composite coil will induce a current in left half-coil 105cd. The induced current results in a magnetic field opposing the direction of movement of left half 104b of the magnetic source 104, resulting in a restoring force on the vehicle, recentering the source around the coil. The dynamics of movement of the right side 104 of the magnetic source 104 are analogous. Or, stated in another manner, as shown in the figure, unlike currents repel, yielding the stabilization force. Alternatively, the guidance system may be composed of separate C shaped magnets with the Cs arranged longitudinally down the track in repulsion, as shown in FIG. 40. The repulsive fields yield a high gradient useful for repulsion. Unlike the lift magnets, these magnet faces extend the height of the guideway coils. This configuration greatly improves the guidance forces as compared to a system that forces the currents left and right to be the same. With this improvement there is an increase in magnetic drag, or one that uses only the differential flux to get guidance.

Figure 41:
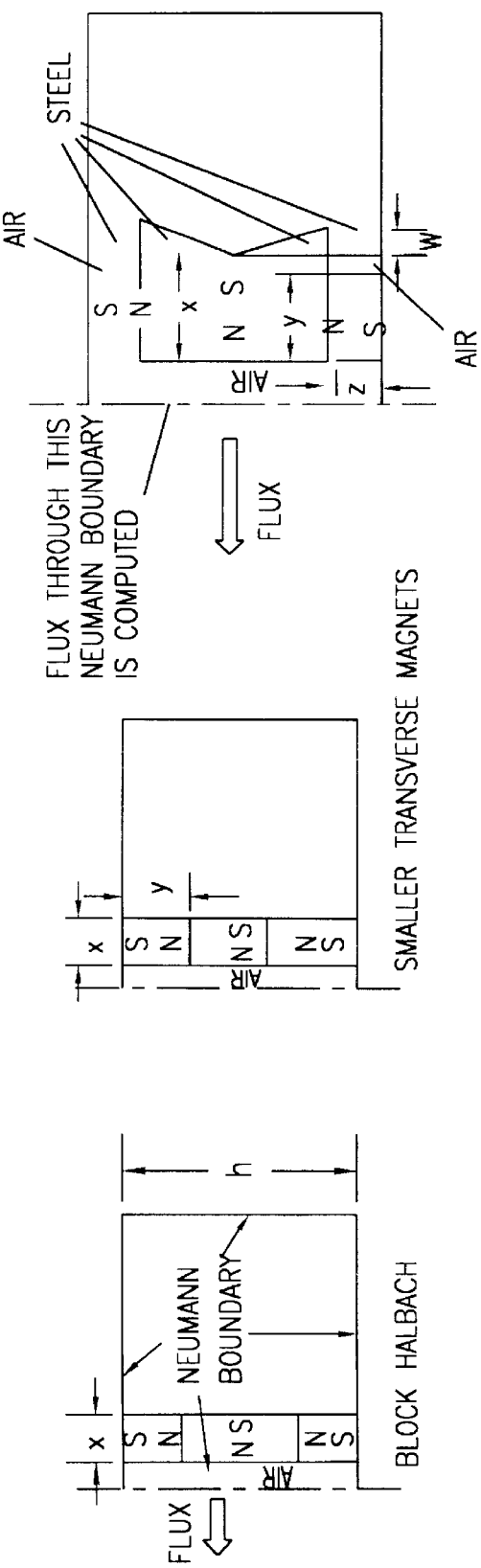
FIGS. 41(a)–(c) are the schematic diagrams of three alternative embodiments of guidance magnets which may be employed with the present invention.

Three other alternative embodiments of guidance magnets are shown in FIG. 41. The optimization process helps determine the most advantageous design. Inset (a) is the block Halbach array. The thickness of the magnets is allowed to vary and the flux is computed through the centerline interface. The simple block Halbach is thus a one parameter optimization; the value of x is sought which minimizes $$\overline{F} = \frac{weight}{flux^2};$$

this occurs when x/h=0.4061. That one parameter optimization is found using, a Newton-Raphson algorithm. Inset (b) is the Halbach array, but the length of the tangential magnets is allowed to vary. This becomes a two parameter optimization. When steel is introduced, additional optimization parameters surface. Shown in Inset (c) is a competing alternative with steel 177 behind the magnets in a triangular shape. The thickness of the tangential magnets is variable, as is the thickness of the steel 177 behind the magnets. Thus, Inset (c) design is a four parameter optimization. The analysis shows first that Inset (b) design is superior to the Inset (a) design, yielding transverse magnets are 28% longer than the tangential magnets. Inset (c) design, however, is superior to either Inset (a) and Inset (b) when the tangential magnets are further shrunk and tapered steel placed behind the magnets. This last configuration also leads to a considerable cost savings.

Figure 9A:
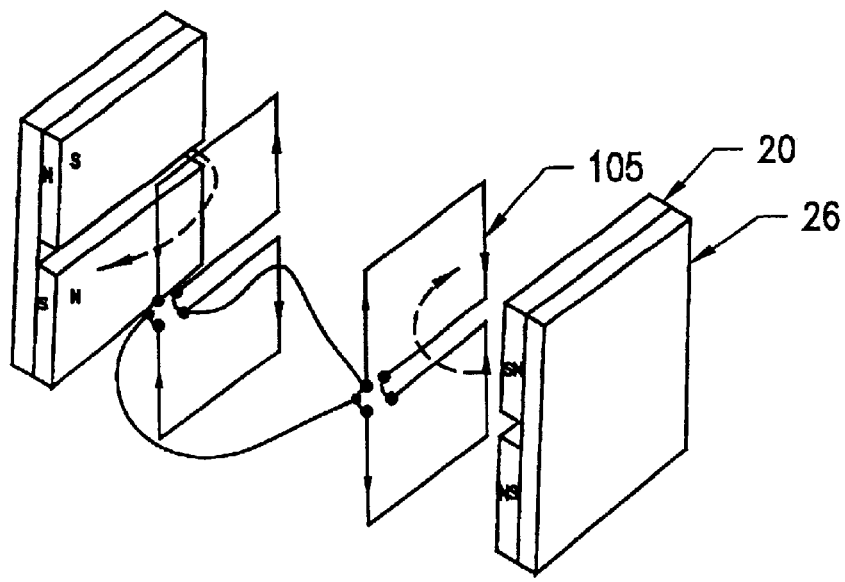
FIG. 9a is a partial schematic of the composite coil between the stacked magnets, and demonstrating how currents are induced to deliver guidance with repulsion magnets.
Figure 10:
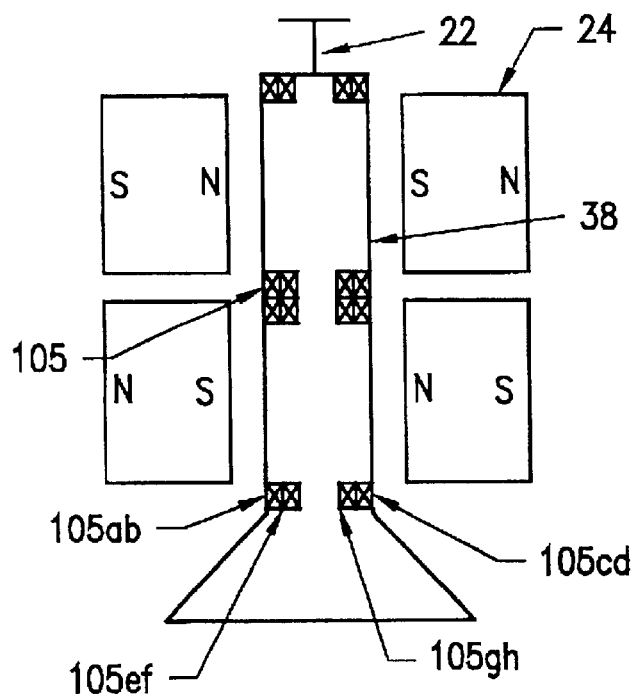
FIG. 10 is a vertical cross-sectional view of an inverted pultrusion to enhance electrical and thermal performance.

FIGS. 9a and 10 depict the placement of each composite coil between the stacked magnets 20 fixed to the back iron 26. The composite coils 105 are affixed in a rail pultrusion 38. One such positioning of the coils in a pultruded rail is depicted in FIG. 10. The pultrusion 38 houses the assembly of the subcoils which comprise the composite coils. The upper cap section of the pultrusion contains a brush contact surface 22 within which a brush from the vehicle will ride to force the propulsion current into the composite coil.

Figure 11:
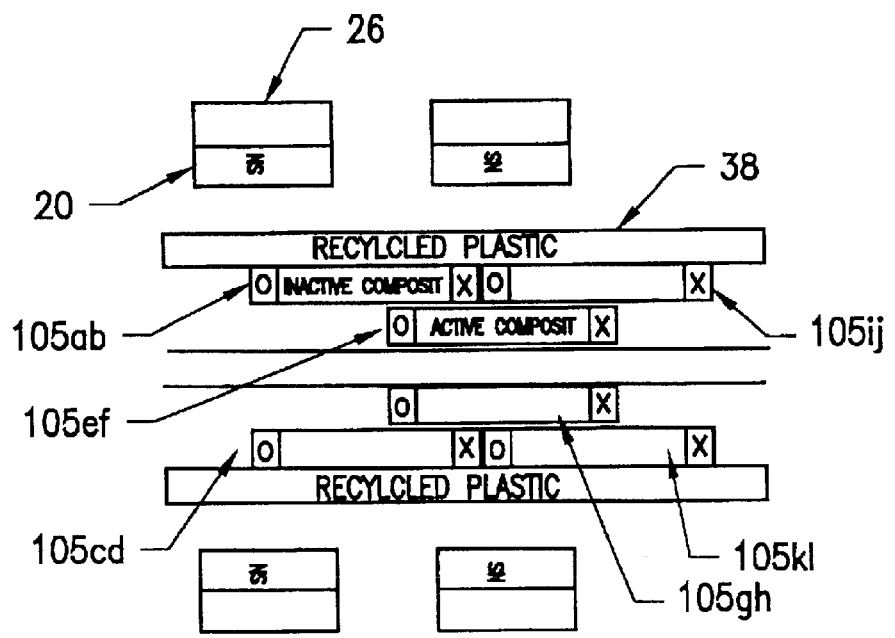
FIG. 11 is a top plan view of the rail showing the composite coil positioning with respect to the magnets, and showing the "staggering" or horizontal overlap of composite coils in adjacent horizontal rows.

FIG. 11 depicts a top view of the rail showing the composite coil positioned with respect to the magnets. Note that it is preferred that the composite coils be arranged in the rail in pairs such that a single composite coil is always displaced axially from its inboard mate. In other words, as shown in FIG. 11, the composite coils are "staggered" such that they horizontally overlap down the length of the rail.

More specifically, a rail of recycled plastic may be said to have at least four horizontal rows of subcoils within it. As shown in FIG. 11 (as viewed from the top of the rail looking down), half-coils 105ab, 105cd, 105ef, 105gh, 105ij, and 105kl are each composed of two subcoils. Half-coils 105ab and 105cd are connected to form a first composite coil; half-coils 105ef and 105gh are connected to form a second composite coil; and, half-coils 105ij and 105kl are connected to form a third composite coil. The composite coils 105abcd, 105efgh and 105ijkl are electrically connected in series, while the four subcoils of each composite coil are electrically connected in parallel. (In other words, subcoils 105a, 105b, 105c and 105d are connected in parallel; subcoils 105e, 105f, 105g and 105h are connected in parallel; and, subcoils 105i, 105j, 105k and 105l are connected in parallel). The first and third composite coils (the "outboard" coils) have their subcoils in the outer rows of the rail, while the second composite coil (the "inboard coil") has its subcoils in the inner rows of the rails. A typical rail will, of course, have many composite coils connected down the length of the rail; the figure shows a cut-away of only three composite coils merely for illustration purposes.

Thus, the second composite coil 105efgh is axially displaced or staggered with respect to the first composite coil 105abcd, and is similarly staggered with respect to the third composite coil 105ijkl. All of the inboard coils are, in fact, staggered with respect to the outboard coils. The use of brushes necessitates this staggering of the composite coils so as to yield a smooth transition of the injected current from one contact surface to the next. In addition, the staggering of the composite coils yields a smooth and continuous lift and guidance force for the vehicle.

The arrangement of the coils and subcoils across the rail may also be seen in FIG. 10. As shown therein, half-coils 105ab, 105cd, 105ef and 105gh are horizontally arranged across a rail. The outer set of half-coils 105ab and 105cd are connected to form a first composite coil 105abcd (the parallel connection is shown in FIG. 8), while the inner set of half-coils 105ef and 105gh are connected to form the second composite coil 105efgh. As discussed in relation to FIG. 11, the inner sets of composite coils are staggered with respect to the outer sets of composite coils in the rail.

Figure 9B:
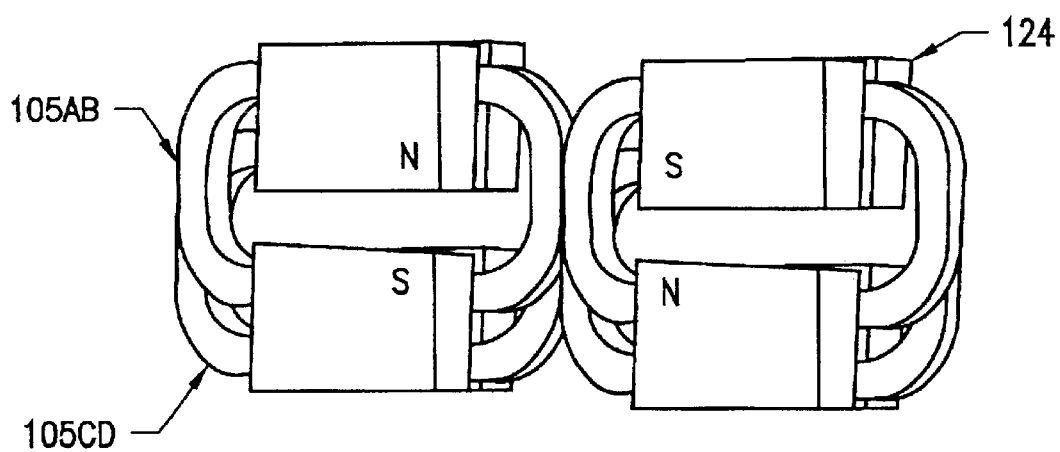
FIG. 9b is a perspective view of the interleaved composite coil arrangement.

A further improvement to the composite coil arrangements discussed previously is to interleave or vertically overlap the composite coils as shown in FIG. 9b. As shown in this figure, composite coil 105 is composed of half-coils 105ab and 105cd. It should be appreciated that 105ab and 105cd each represent two subcoils of the composite coil, as in the embodiments discussed above, and that all four subcoils are connected to form a single coil as shown in FIG. 8. In contrast to the embodiments previously described, however, the half-coils no longer have their upper and lower edges aligned. Rather, one half-coil is elevated with respect to the second, resulting in an "upper coil" (i.e. an upper half-coil) 105ab and a "lower coil" (i.e. a lower half-coil) 105cd. The upper coil and lower coil are connected together to form a single composite coil.

The interleaved composite coils 105 continue to be connected in series as with the stacked coils, however, by interleaving each of the coils so that a segment of the upper coil and a segment of the lower coil share the same magnet face 124 (as shown in FIG. 9b), a significant increase in lift force can be realized. The reason for this increase is two fold. First, twice as much current of the correct phase is induced in the coils and exposed to the correct magnet face to produce lift force. Second, the mutual coupling between the two coils is significantly enhanced; the enhanced inductance in these two coils helps to maintain a 180° electrical phase shift between the equivalent currents on the magnet and the induced currents in the coil. This 180° phase shift is more useful for producing lift force.

Figure 9C:
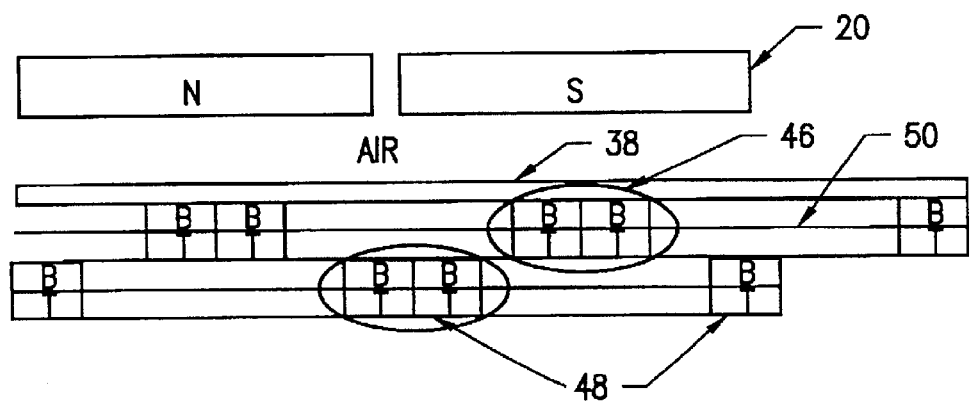
FIG. 9c is a top view of the interleaved composite coils showing a pole patch phase shift between coil pairs.

These interleaved or vertically overlapped composite coils must themselves be placed in the track with pole shifted pairs. As shown in FIG. 9c, "T" refers to an upper or top coil, and "B" refers to a lower or bottom coil. The figure shows a top view of half of the rail, with the magnetic source flanking one side of the rail. The composite coils of one horizontal row 46 are placed at a 90° electrical phase shift from the composite coils of an adjacent horizontal row 48. The 90° electrical phase shift between these rows of composite coils is necessary for proper excitation of the composite coils with the brushes.

It is also preferred that the interleaved composite coils of one horizontal row 46 be staggered or horizontally overlapped with the composite coils of an adjacent horizontal row 48. In addition, like the stacked coil arrangement, the arrangement of both coils can be suspended in a poly vinyl fiberglass sheath 38 and filled with an adhesive filler 50.

Figure 26:
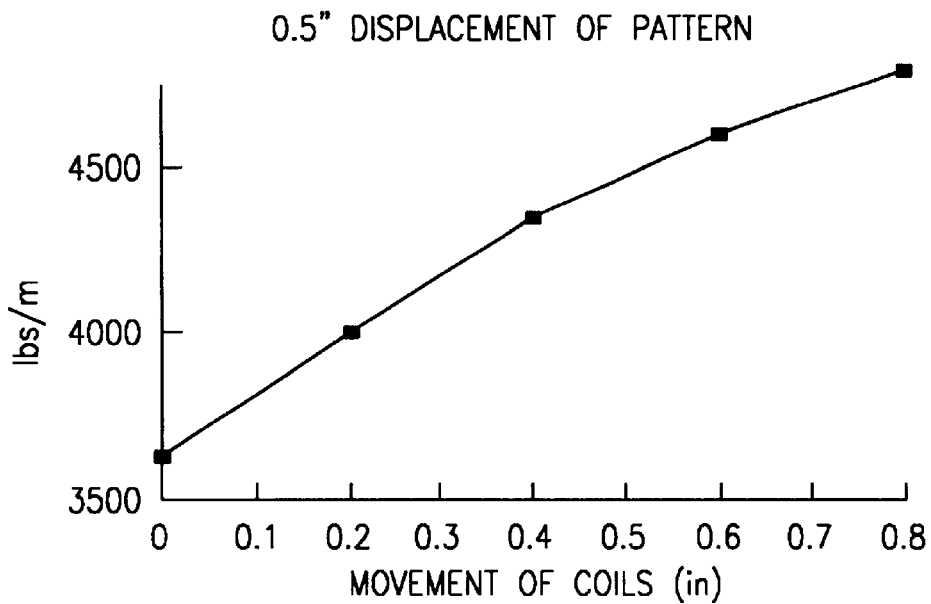
FIG. 26 is a graph showing the lift force generated at a speed equivalent to 95 MPH depending on the movement of the upper and lower coils with respect to each other.
Figure 27:
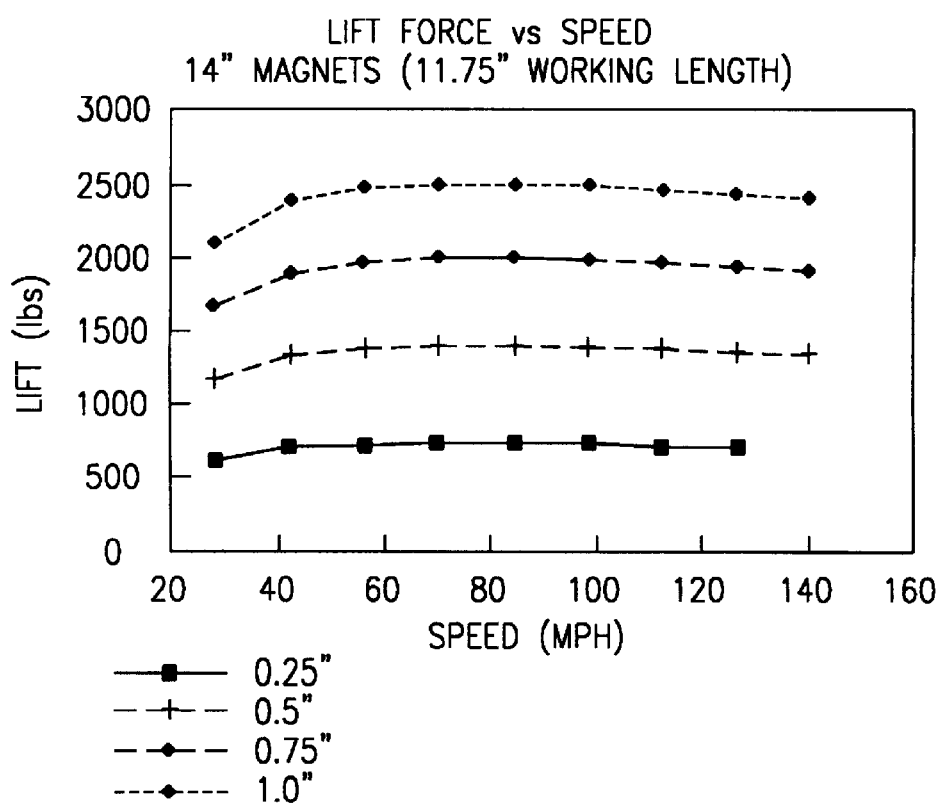
FIG. 27 is a graph representing the lift force at various speeds for various displacements commensurate with 0.7" offset of the coils with respect to the magnets.

As mentioned earlier, one of the chief advantages of the interleaved composite is that it allows all of the current in all horizontal arms of the coil to be used in the generation of lift forces. Of course it is also obvious that the amount of useful vertical conductor for generating propulsion forces is less than that which could be realized from the stacked composite coil. One way to increase the amount of vertical conductor useful for generating propulsion forces is to raise the height of the upper interleaved composite coil and lower the height of the lower interleaved composite coil. Unfortunately, this reduces the efficiency of these coils for producing lift. The reason for the reduction is the proximity of the coil to the fringe region of the magnets. The two objectives are mutually exclusive and a compromise must be sought. FIG. 26 seeks to quantify this effect. Consider placement of the coils around the magnets such that the upper composite coil's upper edge is in line with the upper edge of the upper magnets. Correspondingly, let us also begin by placing the lower coirs lower edge at the same level as the lower edge of magnet. Consider now lowering the upper coil and raising the lower coil in synchronous steps. Consider also the whole pattern being offset 0.5" vertically to begin with. The lift force generated at a speed equivalent to 95 MPH is that, depicted in FIG. 26. Clearly, a considerable increase in lift force is realized with a nominal off setting of these interleaved coils. Based on these results, it was decided that an offset step size of 0.7" is a reasonable compromise between the two worlds of lift and propulsion. FIG. 27 represents the lift force at various speeds for various displacements commensurate with this 0.7" offset of the coils with respect to the magnets. The lift forces represent those, expected using 14" copper coils and 13" neodymium magnets. Two observations are worth noting; first, lift force continues to rise at the low speeds but not significantly and second, lift force continues to diminish at higher speeds. The first observation underscores the point that the inductance/resistance ratio is reasonably high for these coils at the frequencies commensurate with the speeds being plotted. The second observation, the fall off in the lift at higher speeds is both more subtle and incorrect for the model being adopted. The computer model simulated assumed a one turn coil, rather than the twenty turns is actually used in fabrication. As the speed and thus frequency increase, the current is pushed to the outskirts of the conductor. This "skin effect"', as it is so labeled, significantly impairs the amount of current that actually flows by effectively increasing the resistance of the coil. Since we are producing multi-turn coils, the effect will be much lower than that witnessed by these curves. Indeed, as the speed increases the multi-turn aluminum coils should exhibit little skin effect increase in the resistance.

Figure 28:
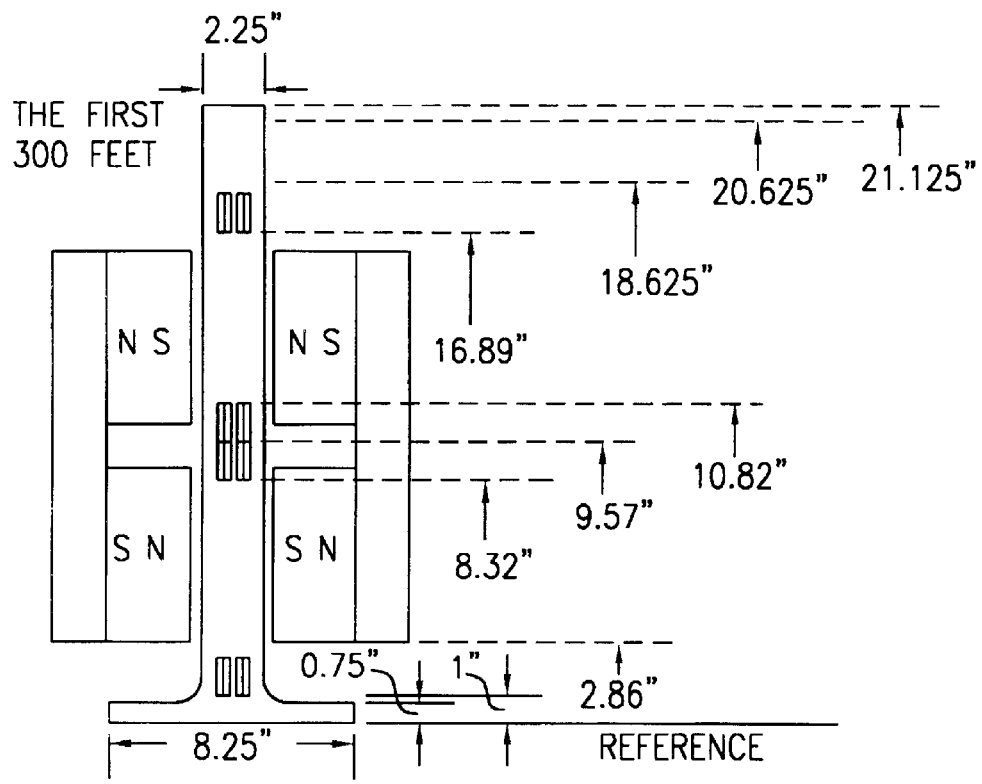
FIG. 28 is a top view of the layout of the rail cross-section for the first 300' of acceleration using the stacked coils.

The effective vertical length suitable for propulsion with the coil arrangement displayed in FIG. 27 is about 3". It would be more desirable to use a larger shadow of the magnet. During the first 300' of travel, the speed is insufficient to realize lift inductively. Thus it appears prudent to use stacked coils during this interim acceleration stage which is comprised not of copper but of aluminum. Unlike the interleaved coils, stacked coils do not take up as much space. Thus although it is possible to fabricate a rail for this first 300' which is thinner, it is probably not prudent since the two rails must connect smoothly. The mandrels laid out for the interleaved composite dictate an inner dimension height for the interleaved coils of 6.07". This is so close to the working facial height of the magnet (6") that it demands an attempt to use them during this acceleration stage. FIG. 28 shows the layout of the rail cross-section for this first 300' of acceleration using the stacked coils. The challenge in specifying the position of these stacked coils is to approximate the null flux position with respect to the running height of the magnets so that virtually no magnetic drag is realized during this stage. The position of these stacked coils and this null point should also be such that during the next stage where lift is to be achieved, the null flux of the second stage of coils must be approximately 0.7" higher than the null point of the first stage of track.

Figures 16A, 16B:
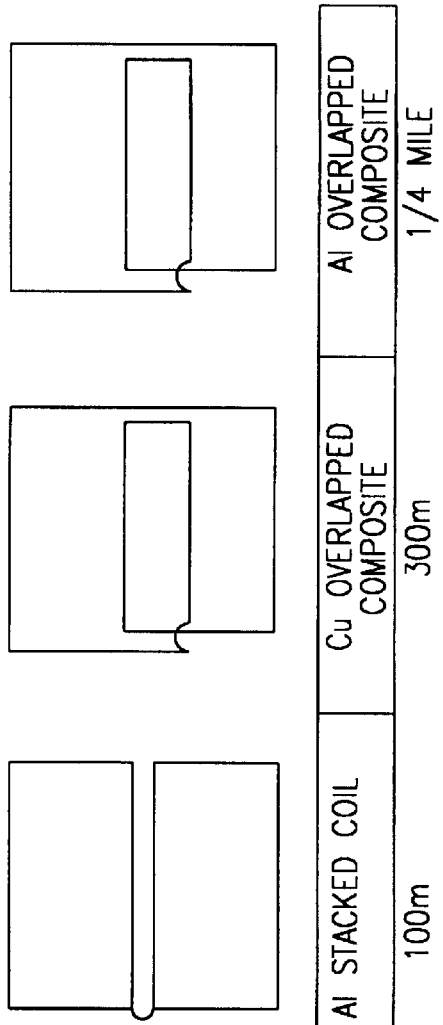
FIG. 16(a) shows the appropriate distance for each of the stages shown in FIG. 16(b) assuming the vehicle accelerates at a speed of 1.5 m/s$^2$.
FIG. 16(b) is a schematic diagram of the rail layout suggesting the staging of coils along the rail.

As discussed earlier, the better propulsion is achieved with stacked composite coils, However, the overlapped composite coils work better at achieving lift. Therefore, the "perfect" system should be built with three types of coils. The first section of track, up to 40 MPH should use only stacked coils centered on the magnets. The centered stacked coil makes the best use of the field for propulsion. The overlapped composite suffers a slight diminution of vertical conductor length useful for propulsion; with the present design this means a 1.25" diminution over the face of the coil for each coil pass, or about 21%. The next section of track from the liftoff speed for copper (40 MPH) up to that suitable for liftoff for aluminum (80 MPH) should be constructed of copper. The final section of track from 80 MPH to the top cruise speed and down again to 80 MPH should be made of overlapped aluminum composite coils. The actual distance for each section is to be determined in accordance with the vehicle acceleration. Table in FIG. 16(*a*) shows the appropriate distance for each of these stages assuming the vehicle accelerates at a speed of 1.5 m/s². In this scenario, the stacked coils would be used for the first 108*m*, then copper overlapped composites for the next 324 m, and overlapped aluminum composites for the remainder of the track. A schematic of the rail layout suggesting the staging is shown in FIG. 16(*b*).

The rail coils may also be composed of concentric frames, each of which is electrically isolated from its neighbor. The use of such frames insures that:

a. Unwanted induced eddy currents are kept to a minimum.
   b. Electrical redundancy is increased since each coil is independent.
   c. Higher reliability is realized since the connections of either the copper or aluminum coils are performed in an automated coil shop, and the ends are electrically brazed.

Figure 29:
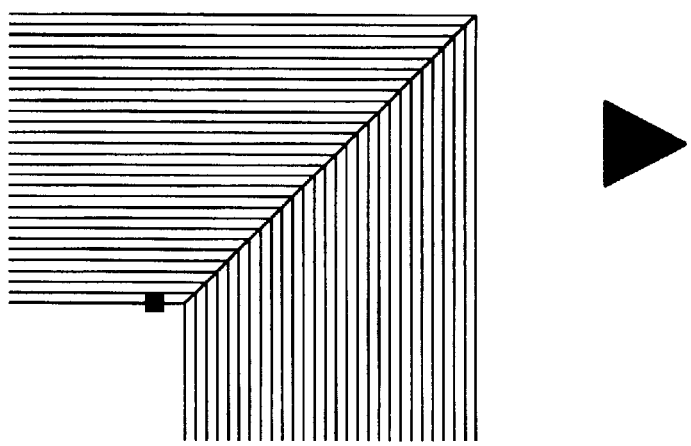
FIG. 29 is a blowup of the discrete frames that constitute a coil in accordance with one of the embodiments of the present invention.

The guideway is then fabricated as a set of discrete concentric picture frames. It is desirable to keep the buildup width for the coils down to one inch. One convenient wire size appears to be with wire of size 0.144 by 0.229. The pole pitch or length of the coils is targeted at 19". A 4.03" buildup is realized through the use of 28 0.144" wires. It will actually be slightly larger due to the necessary buildup thickness. Shown in FIG. 29 is a blowup of the discrete frames that constitute a coil. The discrete frames are insulated, but sit within one another. This guarantees a high degree of redundancy; any one of the frames may fail to make a good electrical connection for its loop with time and the system impact is very small. All electrical connections are circumvented during the assembly of the rail. As explained previously, the coils are staggered in two phases. One phase (e.g. the outboard group of coils) is advanced longitudinally with respect to the other phase (inboard) as suggested in FIG. 30. This assemblage has been tested analytically for force production and was found to differ from a continuous rail with the volume of conductor by only 10%. Secondly, the lift imparted to the vehicle is nearly continuous as well. Long rectangular coils have a superior inductance/resistance (L/R) ratio over square or circular coils. The higher L/R ratio is helpful for realizing lift at low velocities.

Figure 32:
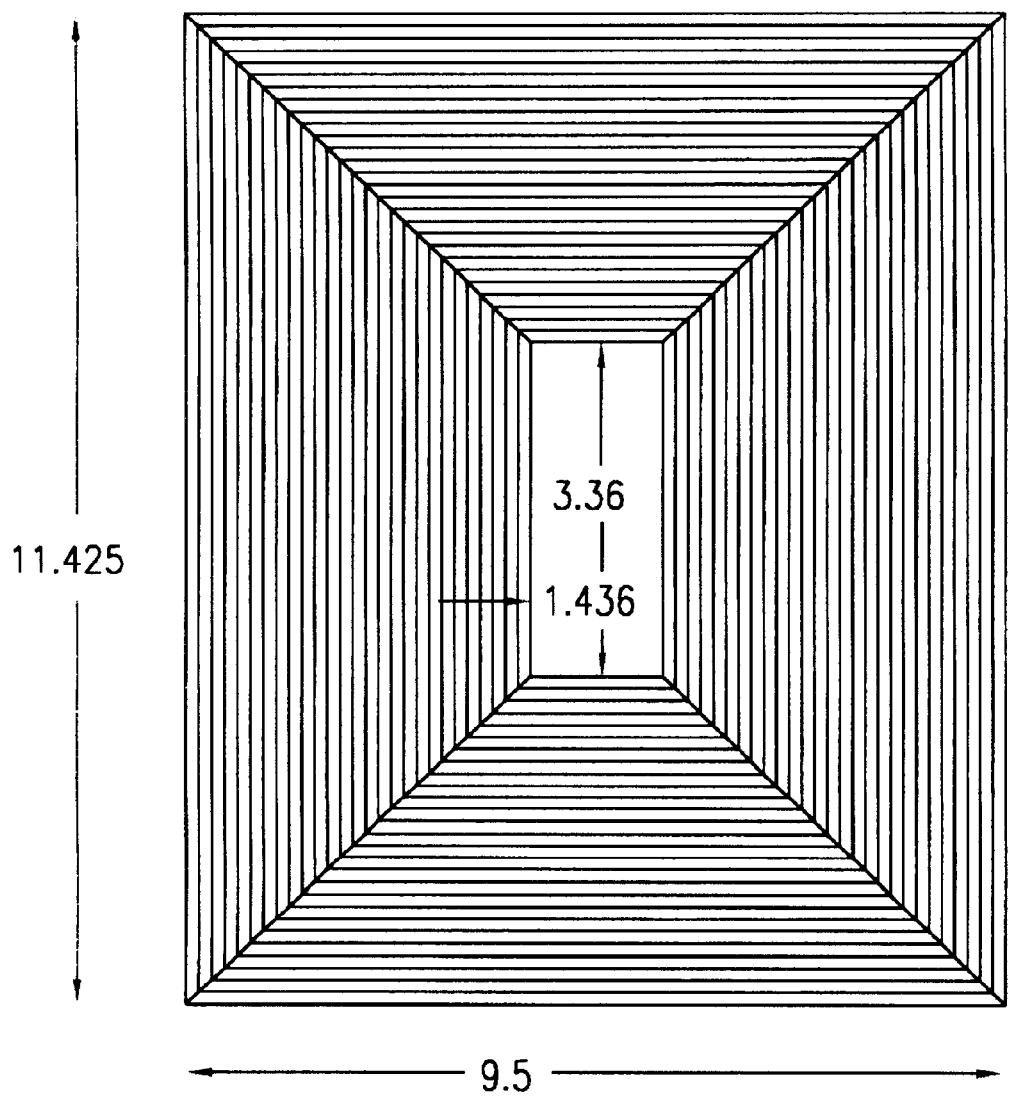
FIG. 32 is a front view of a shorter coil having half the extension of a normal coil.

The coils are preferably clustered together in groups of 16 to make an isolated rail. Sixteen of the coils so defined when aligned end to end compose a rail 133" long as shown in FIG. 31. The lower insert shows a side view of 4 groups of coils split for clarity. The outboard sets A and D begin and end with a shorter coil ½ pole pitch long. The total rail length is 134"; the additional 1" is simply an expansion filler inserted between rails. It might be tempting to join coils B and C together since they have the same shape. This temptation should be resisted, since it would encourage additional eddy currents on the end plate (now 0.229) of the coils. The shorter coil preferably looks like that shown in FIG. 32. It has the same height, but half the extension length. The window area for this choice of pole pitch (19") has shrunk to 1.436" by 3.36".

With respect to the magnetic source affixed to the vehicle, it is desirable both from a lift and propulsion perspective to arrange the magnets in clusters, cyclically alternating the polarity of the magnets as N-S-N-S. Clustering the magnets allows for use of both vertical legs of current in propulsion, and encourages a higher equivalent frequency of excitation for the composite coils.

When excitation of the rail via brushes is employed, an additional enhancement can be realized which allows for the series connection of the brushes. It is possible to alternately cross-connect the coils to the brush collector plates in such a way as to allow for the excitation of only the leading magnet and the trailing magnet in any one cluster. By using both sides of the vertical rail to inject current, and allowing for the injection of both polarities of current, exciting only the leading magnet brushes and the trailing brushes results in current flowing sequentially through all the coils between these brushes. Such a series excitation of the rail significantly reduces the weight of the vehicle by eliminating a large number of brush injector mechanisms. Secondly, it decreases the maintenance since fewer brushes are employed for the vehicle. Thirdly, it reduces the drag commensurate with the use of the brushes; each brush pad must necessarily be pressed against the side of the collector plates. Fewer pads translates into smaller drag on the vehicle.

Shown in FIG. 9d is a rough depiction of a series arrangement of the brushes which allows for the advantages of lower vehicle weight, and fewer brush mechanisms. The current is injected into brushes 125 and 130 at only the leading and trailing edge of the magnets 20.

The series arrangement of the brushes sketched in FIG. 9d is shown and described in FIG. 9e in greater detail. A first coil design is shown in FIG. 9(e) inset (a). In this design, to connect the coils 105 in series it is necessary to employ a separate brush 118 connection between all collector plates 120 as shown.

FIG. 9(e) inset (b), however, shows a preferred embodiment which improves upon the design shown in FIG. 9(e) inset (a). In the improved design, every other coil connection is switched. This innovation allows the injection of current using leading magnet brush 125 and trailing magnet brush 130 only, eliminating the need for intermediate brushes. The flow of current indicated by the arrows shows how a unidirected force is achieved.

Figure 9F:
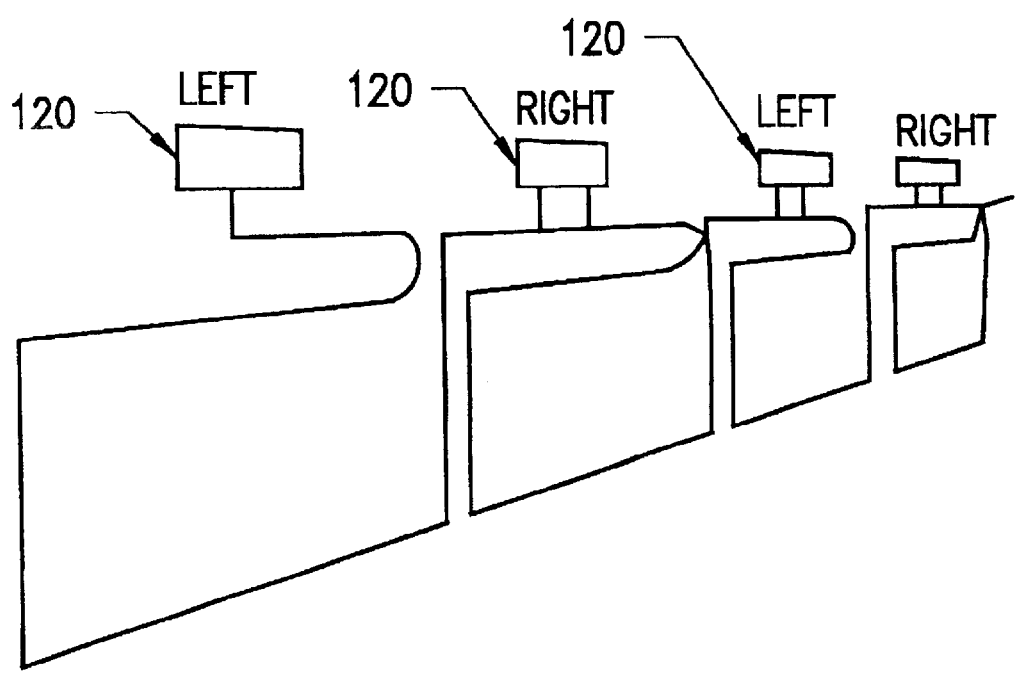
FIG. 9f is a perspective view of connections of the composite coils to the collector plates, in accordance with the embodiment of FIG. 9e(b).

As the magnets are allowed to translate down the track to the next coil section, their polarity would not be correct to yield a force in the same direction as that commensurate with FIG. 9e. Thus, the connection to the collector plates of the unswitched coils must always go to one side of the vertical rail (the left for example), while the switch coil connections must always go to the opposite collector plate. The connections of the coils to the collector plates 120 is depicted by FIG. 9f. This means that at any one time either the left or the right collector plates are excited but never both. Further description of the coils and their interconnections is provided in Appendix B, which is incorporated herein by reference.

Figure 12:
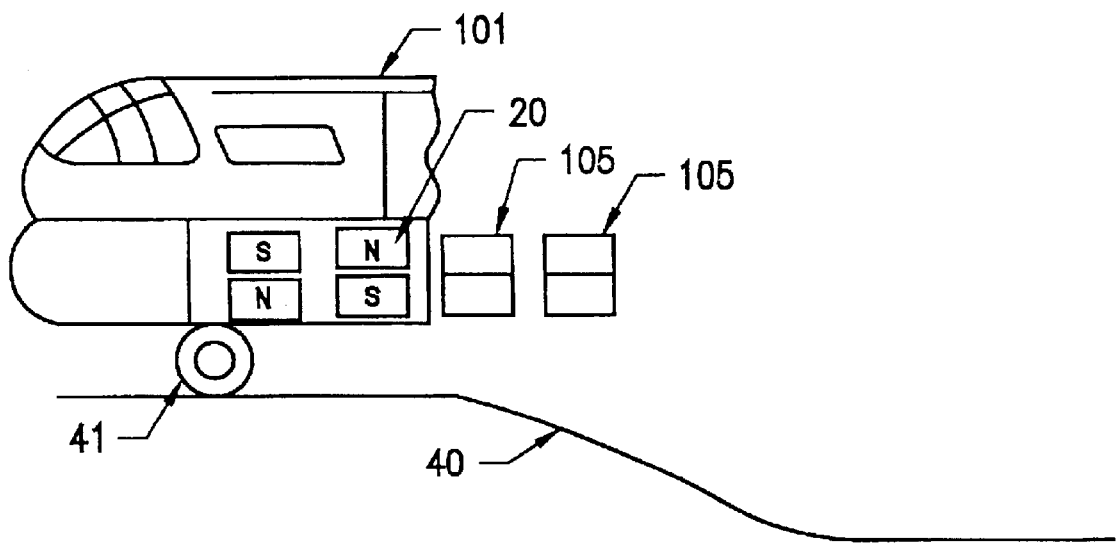
FIG. 12 is a partial side view of a train, in accordance with the present system and also having a past threshold speed to get lift off.

As mentioned in the Summary of the Invention section, the track-based composite coils are incapable of levitating and stabilizing the vehicle at low speeds. One alternative for addressing this problem at low speeds is shown in FIG. 12. Wheels 41 affixed to the bottom of the vehicle 101 are used to support the vehicle 101 at speeds above the peak drag force speed. One of two alternatives are available. First, the wheels can be retracted as with conventional aircraft. Second, the guideway surface 40 can be sloped away from the rail composite coil structure. Note that prior to this point, the height and position of the rails are such that no net flux would be induced in the composite coils due to the centering of the magnets on the composite coils. This eliminates all drag prior to the lift off point.

Figure 13:
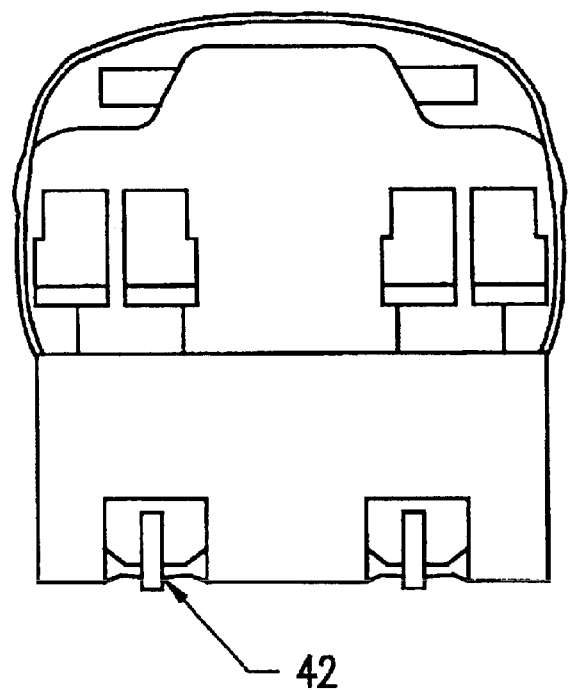
FIG. 13 is a vertical cross-sectional view of a train in accordance with the present invention and showing spring loaded guidance wheels to get stabilization of the train at low speed.

Shown in FIG. 13 is the equivalent use of spring loaded wheels 42 providing lateral guidance for the vehicle. Above the threshold speed, these wheels can be simply retracted. Alternatively, they can be affixed to the vehicle so as to allow some lateral freedom of movement at lower speeds.

Figure 14:
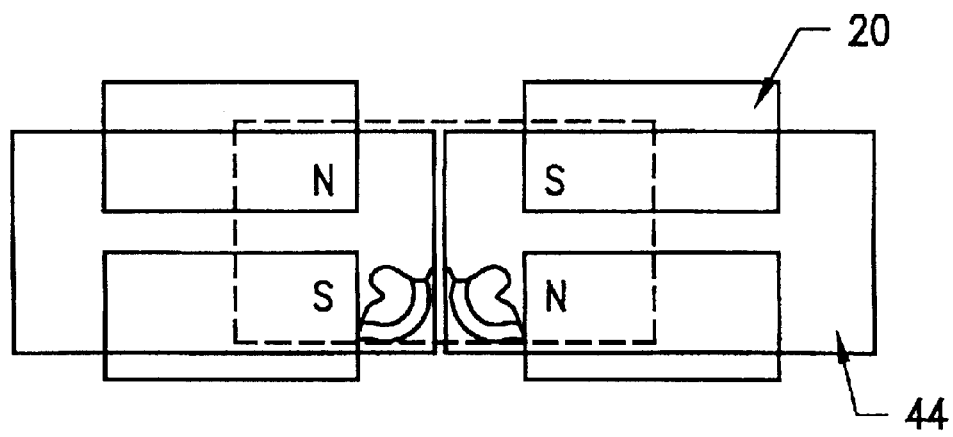
FIG. 14 is a side view of active supplemental lift coils.

FIG. 14 shows another alternative for delivering lift at low speeds. This alternative utilizes an additional coil situated in the track. The leads of this additional active lift coil 44 actually run through the face of the stacked magnets 20 to deliver supplemental lift. They are themselves excited by an additional set of brushes affixed to the rail surface.

Figure 15:
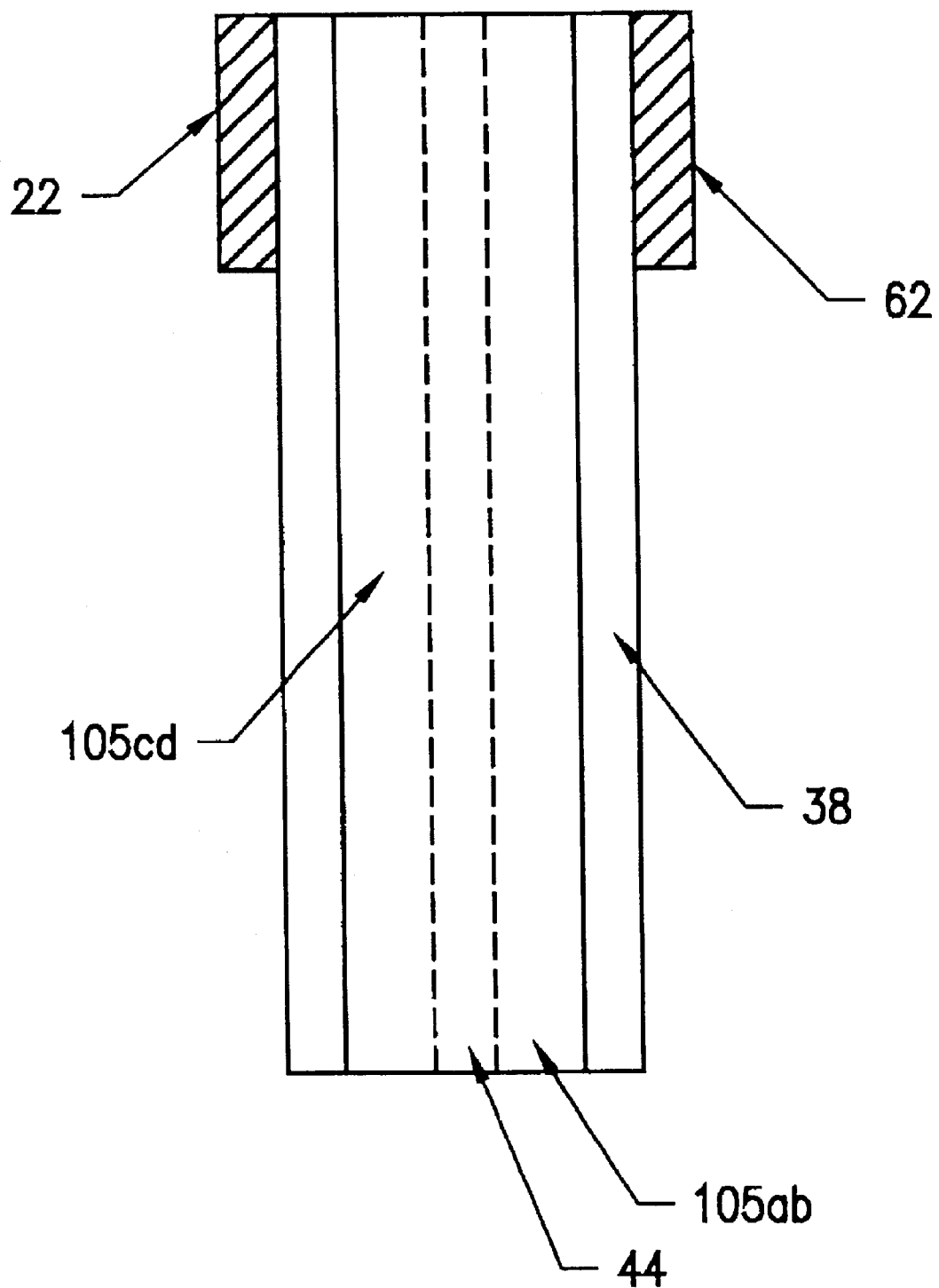
FIG. 15 is a side view of a rail constructed in accordance with the present invention and including active supplemental lift coils.

FIG. 15 shows a cross-section of the rail showing incorporation of both the composite coils and the active supplemental lift coils. The half-coils of the composite coils 105 are displaced both to the left and the right of the rail centerline whereas the active lift coil 44 is positioned centrally within the rail. The brush contact surface 22 continues to provide the current for propulsion while a new contact surface 62 must be utilized to provide additional input for current for the active lift coil. Notice that in this configuration, the pultrusion 38 acts like a sandwich in that it is positioned externally to both the composite and the secondary active lift coils. It is more efficient thermally and electrically to position the composite coils as far outboard of the rail as possible. The configuration for example in FIG. 10 would be more beneficial for thermal cooling as well as enhancing lateral stabilization forces. The ability of the composite coil to deliver guidance is increased by the distance of separation of the left side of the composite coil with respect to the right.

From its earliest incipience, the idea of using vertical pickets surrounding a horizontal magnetic field has received both praise and criticism. Its simplicity lends itself to ease of construction and a much lower truck cost. On the other hand it has up to this point has been labeled a low voltage, high current machine and as such, very inefficient. The new coil topography and the winding connections, as disclosed in the present application, overcome this limitation of the prior art. A second objection which was frequently raised regarding the use of the vertical pickets surrounding a horizontal magnetic field, is that such system can not be used with the brushes. In accordance with another embodiment of the present invention, a series wound DC motor is provided which, while not eliminating the brushes completely, reduces their use to a minimum. As will be shown hereinafter, it is preferable to have only a leading and trailing brush mechanism over a series of coils for proper system operation. Thus, the maintenance for the brushes and a drag accompanying the use of the brushes are likewise reduced to a minimum.

Figure 19:
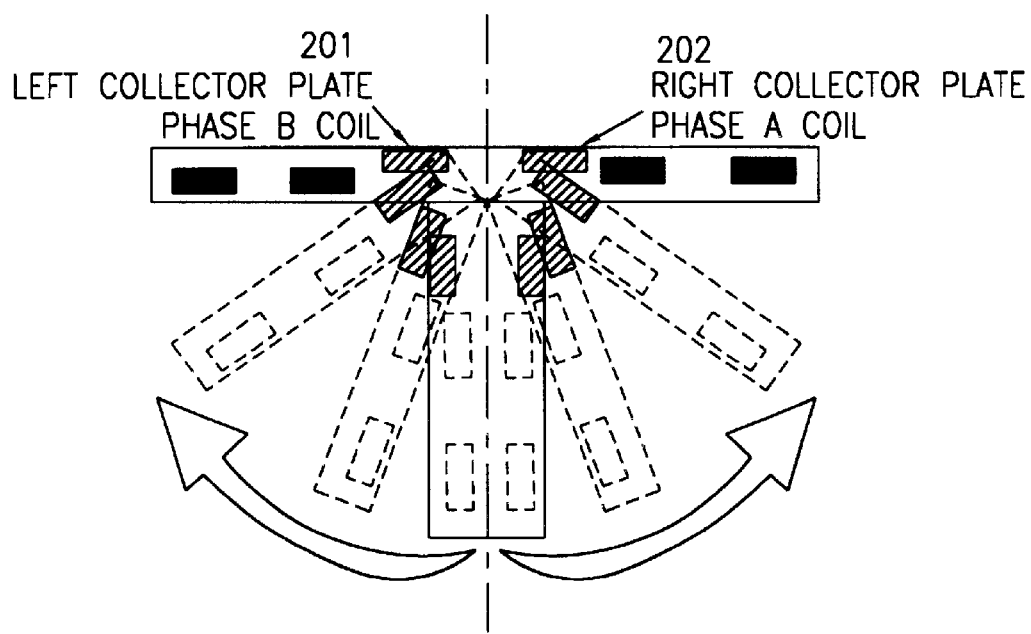
FIG. 19 is showing the process of cutting a vertical rail, containing two 90° phase shifted coils, down the center and folding it out around an imaginary hinge point placed between the two collector plates.
Figure 20:
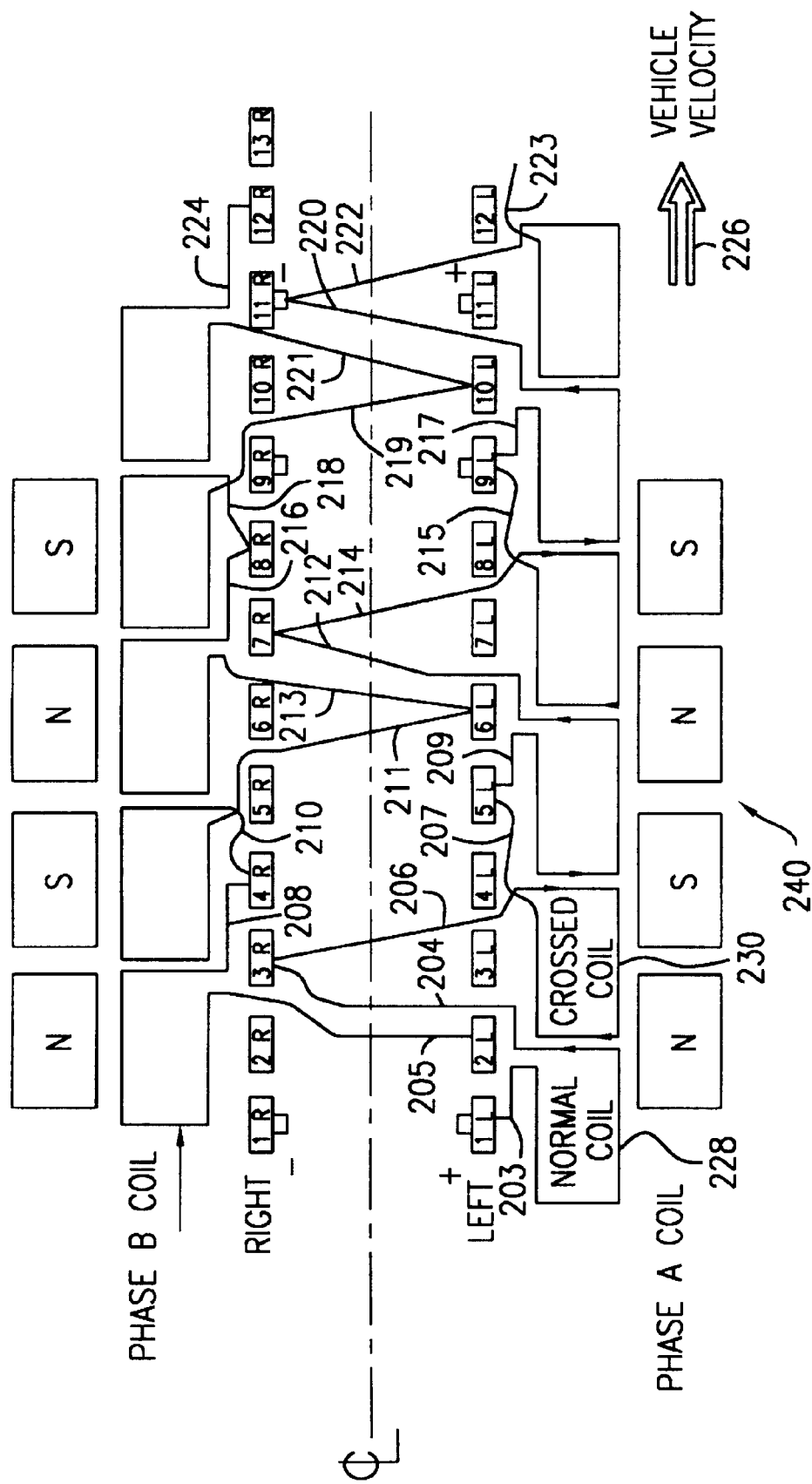
FIG. 20 is a top view of the unfolded rail structure shown in FIG. 19 showing two phase shifted coils and their interconnections on the collector plates.

By way of getting an understanding of the coils and their interconnection, consider cutting a vertical rail, containing two 90° phase shifted coils, down the center and folding it out around an imaginary hinge point placed between the two collector plates 201 and 202, as shown in FIG. 19. Folding the coils out allows to look on top of the structure and see both the coils and the plates at the same time. Shown in FIG. 20, is the top view looking down on this unfolded structure. In the preferred embodiment shown in FIG. 20, for both the phase A coils and the 90° phase shifted coils, odd numbered wires, i.e., 203, 205, 207 etc., always connect to the left set of collector plates. Even numbered wires, i.e., 204, 206, 208, etc., always connect to the right set of collector plates. Additionally, even numbered wires connect ahead, toward the direction of the travel, and odd numbered wires connect back for all normal coils such as coil 228. For crossed coils, such as coil 230, the direction of wires is reversed. In the preferred embodiment, every other coil alternates its placement of the even and odd numbered leads. The arrow 226 points in the direction of the vehicle's velocity. The magnets 240 are placed at an appropriate point for excitation of the Phase A coils system. Brush mechanism preferably begins three plates ahead of the leading South pole and ends one plate behind the trailing North pole. Note that, in the embodiment shown in FIG. 20, the brushes lead and lag all magnets and are always positive on the left collector plate system and always negative on the right. When the left brush system is on, right is off and vice versa. Note also that two active coil vertical bars are excited under the shadow of any given magnet. It should be clear that on any one side, the collector plates are active in a pattern "on, on, off, off, on, on, off, off, etc.". Therefore, plates 1R, 2R, 3L, 4L, 5R, 6R, 7L, 8L, etc. are always inactive. Since they never carry current and no connections are made to these plates, it is tempting to leave them out completely and place a fiberglass filler in these holes. However, due to a wear differential witnessed by the brushes as they move from a stainless steel plate to a fiberglass filler, this option may not be wise for the life of the brush. A better option might be to use a longer thinner stainless steel plates bridging the bulk of this region. Although the plates are depicted as rectangles in this figure, they should preferably be cut on a 30° angle in what is classically referred to as the scarf cut with no filler residing in the gap between the plates. The scarf cut allows the brushes to bridge the distance from one collector plate to its neighbor without any filler, thereby extending the life of the brushes by eliminating any friction differential.

Figure 21:
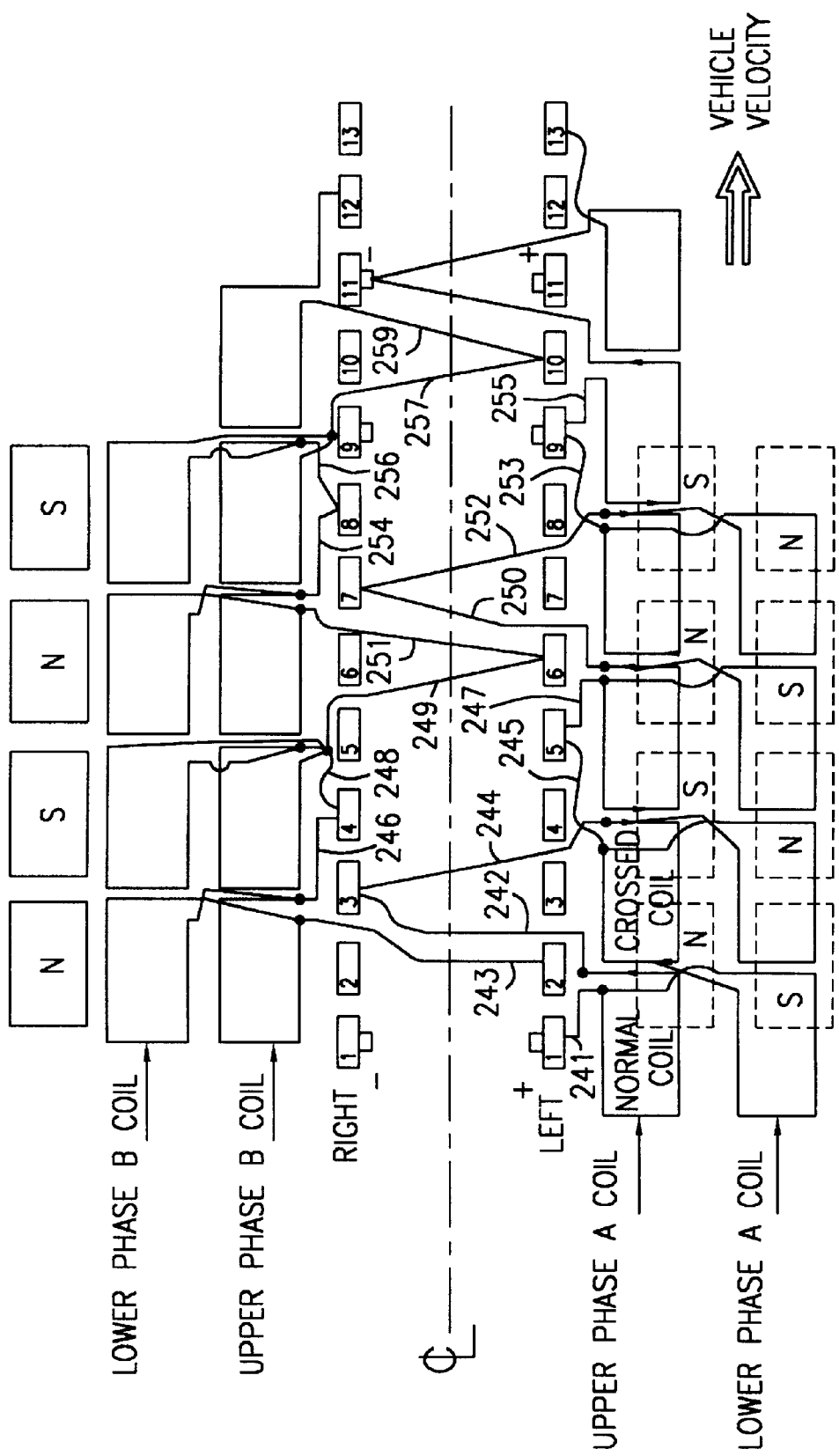
FIG. 21 is a top view of both the upper and lower coils and their interconnections on the collector plates.

Shown in FIG. 21, is a top view of both the upper and lower coils. The wiring rules described above for the upper coils apply equally to all coils with the provision that the lower coil leads are oppositely numbered in odd/even fashion from their neighbors above. For the upper coils the lead connected to the left set of plates is always odd numbered, whereas for the lower coils the odd numbered leads are connected to the right set of plates. With this one change the winding connections are identical to those described above with respect to FIG. 20.

Figure 33A:
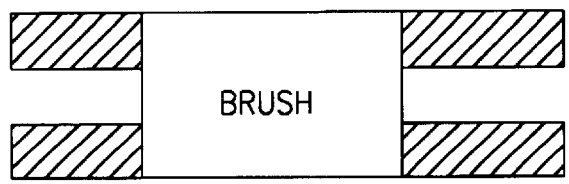
FIG. 33(a) is a schematic diagram showing brush acting as a slip ring across the plates.
Figure 33B:
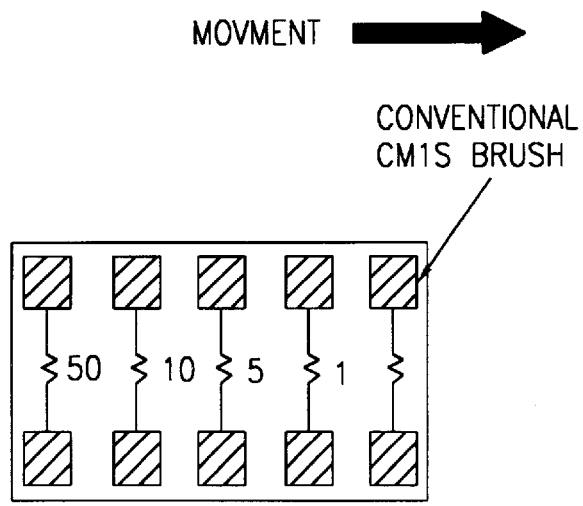
FIG. 33(b) is a schematic diagram of a graded resistive sliding brush.
Figure 33C:
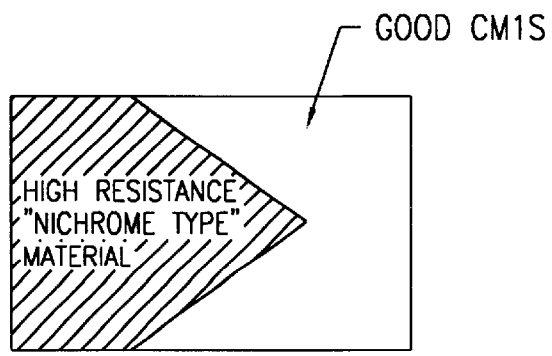
FIG. 33(c) is a schematic diagram of a composite brush showing a monotonically increasing resistance toward the back of the brush.

The series wound dc motor has many advantages, among those being easy power handling and the requirement that the track be touched only twice. However, as the brush slides from one plate to the next a spark is generated. This spark can be nearly eliminated if the brush is composed of pads with a graduated resistance towards its back. The brushes insuring this connection are more analogous to a slip ring contact since commutation is so infrequent. Because of this unique duty and configuration, they can be fabricated with a monotonically increasing resistance toward the back of the brush. FIG. 33 shows two options for this construction. Inset (b) uses conventional brush pads on either plate with individual resistors connecting the pads. Inset (c) details a composite material at the front of the brush sandwiched around a higher resistive material at the rear of the brush. This is a way to deal with arc suppression in any embodiment in which the bogie acts as a switch, i.e., where the brush current is transverse to the bogie movement.

Figure 42:
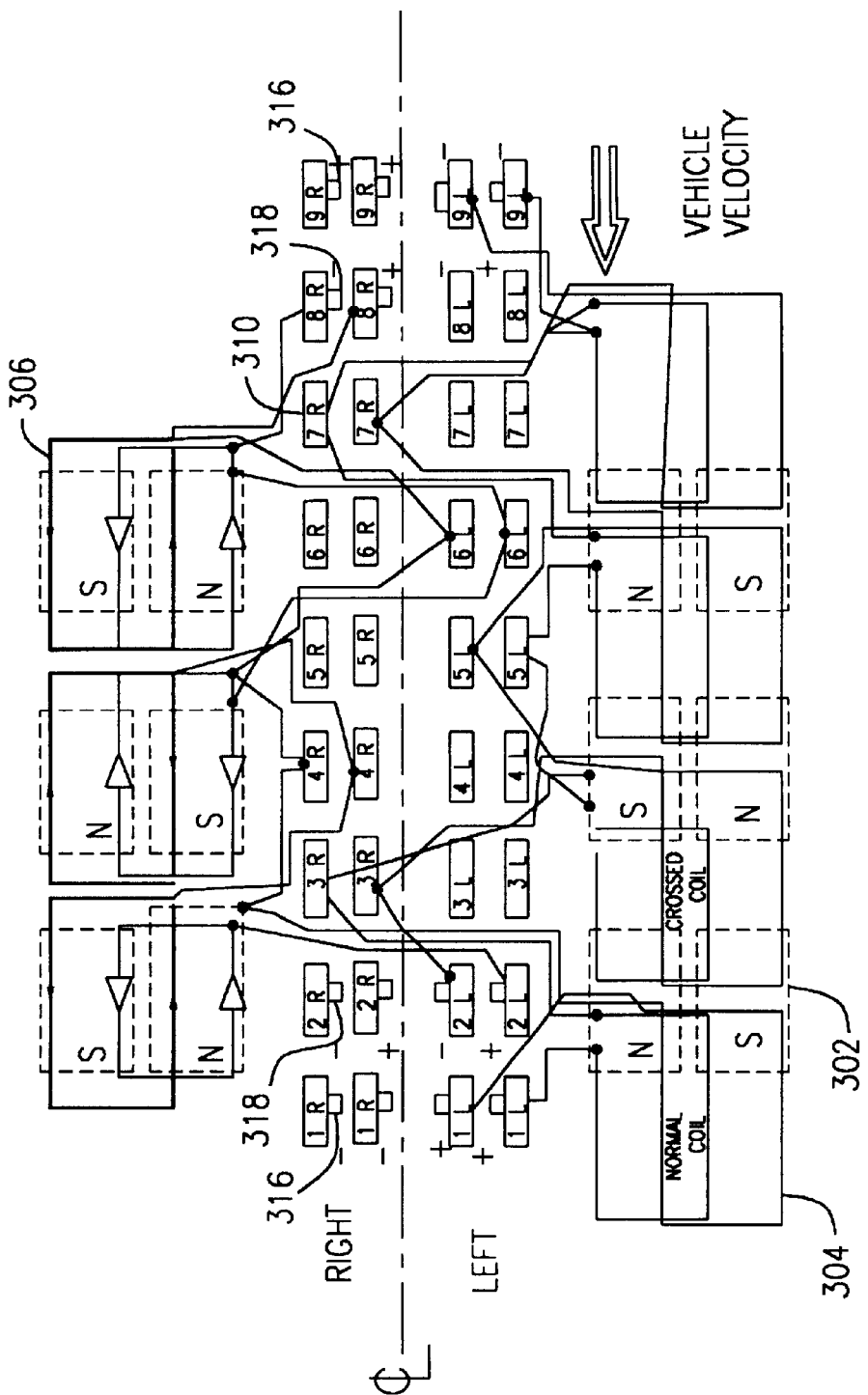
FIG. 42 is a schematic diagram of a layout of the interleaved overlapped composite coil with an additional set of collector plates and an additional set of brushes serving the role of injecting current to produce lift.

FIG. 42 shows a layout of the interleaved overlapped composite coil with an additional set of collector plates serving the role of injecting current to produce lift. The brushes 318 at positions 2 and 8 energize the phase shifted coil 306 to produce lift. Simultaneously, the brushes 316 at positions 1 and 9 inject current in the primary phase A coils at position 4 for producing propulsion. Note that the upper and lower coils do not connect to the same collector plate. The power supply for the propulsion current must be independent from that for the lift current and electrically isolated. The power can be brought into the vehicle by a number of means. For example, DC current can be energized along three rails, a ground rail return for both propulsion and lift power supply, a positive DC rail for propulsion power supply, and, thirdly, a positive power rail for lift. Alternatively, a three phase AC power pickup can be arranged and massaged inside the vehicle. In this alternative the three phase AC power is rectified in two thyristor bridges, one for propulsion and second for lift. This arrangement does not allow induced current to flow freely. Secondly, having to place an additional set of collector plates everywhere along the track is undesirable.

Figure 43:
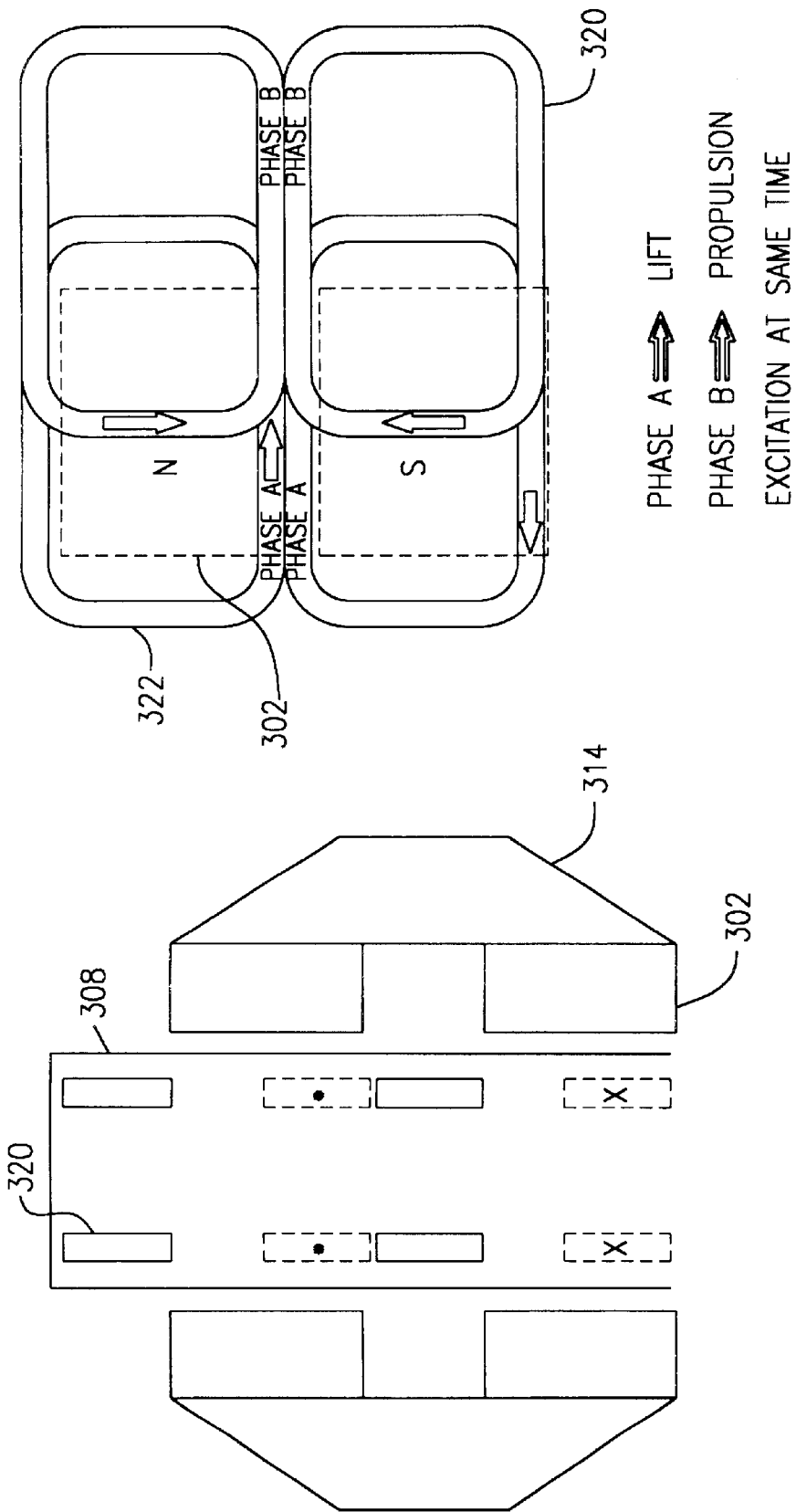
FIG. 43(a) is an end view of the rail with stacked coils positioned between the magnets, (b) is a side view of the coils and their phase shifted pair.

FIG. 43, inset (a) shows an end view of the rail 308 with stacked coils 320 positioned between the magnets 302. These stacked coils are much more efficient for delivering propulsion force. As explained above, when they are offset slightly in the vertical direction, they are useful for producing lift. Inset (b) of FIG. 43 shows a side view of the coils 320 and their phase shifted pair 322. The phase shifted pair serves the role of producing lift.

Figure 44:
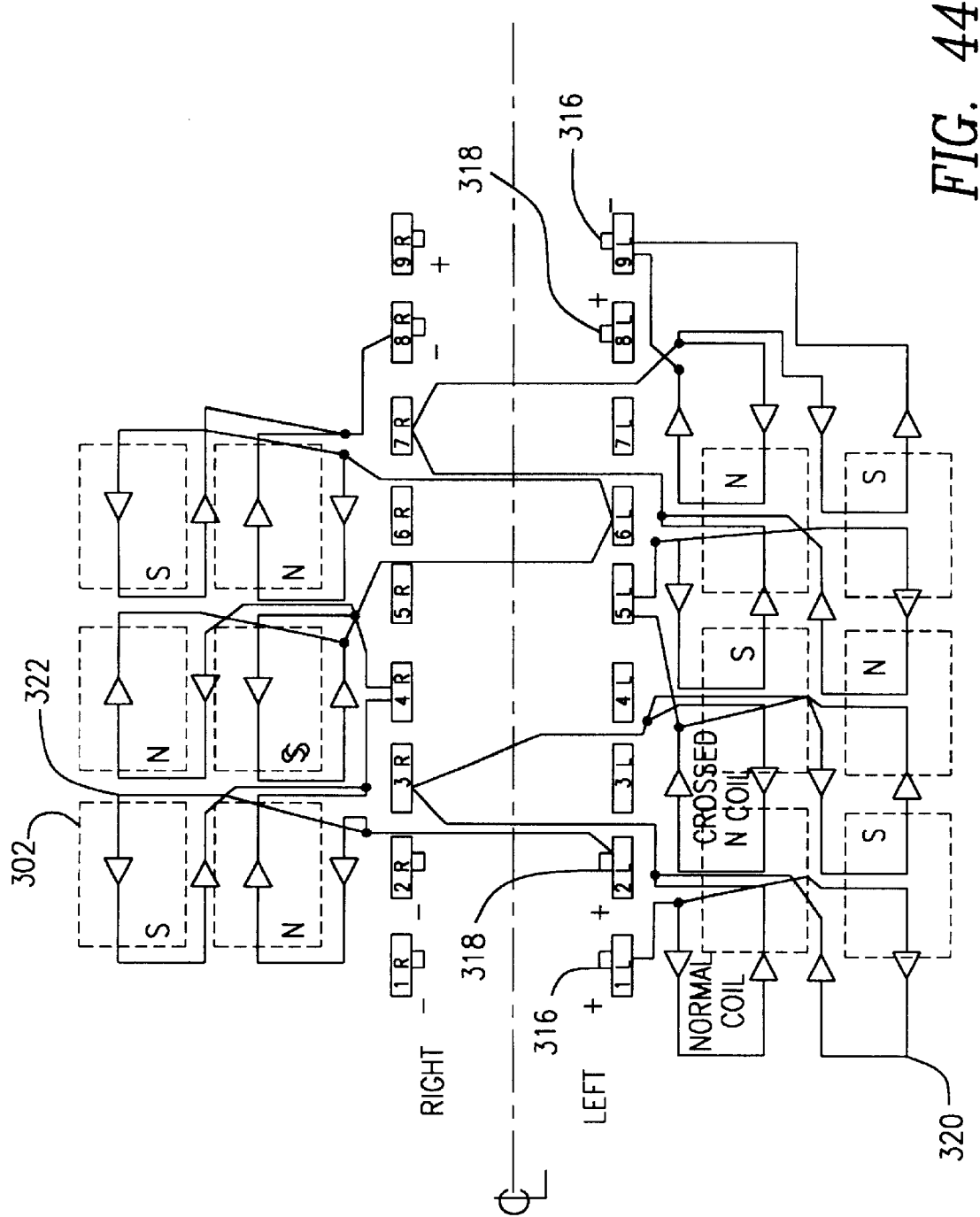
FIG. 44 is a schematic diagram of the layout of the stacked coils and their interconections with the collector plates with an additional set of brushes.

FIG. 44 shows the layout of these stacked coils and their interconnections with the collector plates. Note that the lift brushes 318 energize the phase shifted coils 322 while at the same time, the propulsion brushes 316 energize the phase unshifted coils 320 to deliver propulsion force. Note also that the central members of the phase shifted coils 322 carry currents in like directions. As these coils are in fact moved as a unit closer to the collectors plates, they will produce even greater lift force. This yields a self-restoring spring constant to contain the vehicle at a given height under a variable load. The connections with the upper and lower coils serve to demonstrate that they are in fact connected naturally in series. Any movement of the two coils as a unit which causes a greater linkage of flux with the coils will result in circulating current. This passively induced circulating current will serve to restore, i.e., move the coils back to their null flax position.

Figure 17:
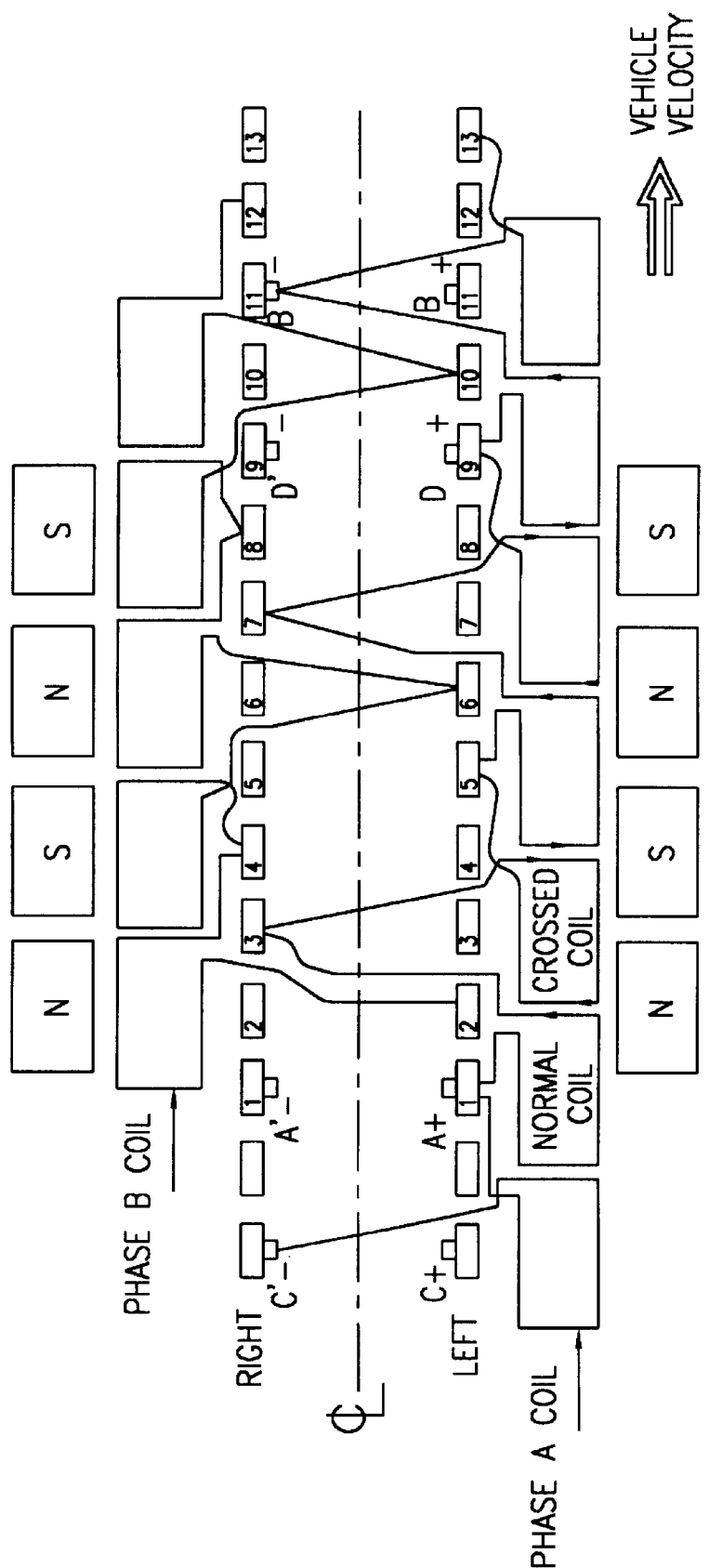
FIG. 17 is a schematic diagram showing coil connections when a two-brush mechanism is used to reverse the direction of the vehicle.

The question of reversing the direction of the vehicle deserves special attention. A well designed vehicle is not symmetrical fore and aft; the leading edge of the vehicle must be tapered and the trailing edge more blunt to achieve more efficient vortex shedding along the skin of the body. Thus for high speed vehicles it is not wise to consider modifying the brush mechanism to allow the vehicle to run in both directions. However, for low speed people movers, a modification of the brush mechanism which would allow the vehicle to run in both directions would constitute a savings in the avoidance of rail complication by allowing the vehicle to run on a single track in both directions. One way to achieve this result is to lift the brush mechanism, rotate it 180°, and put it back down again for the return journey of the vehicle. However, the most efficient direction reversal is accomplished by carrying two brush mechanisms on board the vehicle energizing one set of mechanisms for travel down the track and the opposite set for its return. Excitation of the brush mechanisms A–A' and B–B', in FIG. 17, will allow for the movement of the vehicle to the right. Excitation of the brush mechanisms C–C' and D–D', alternatively, will allow for the vehicle's movement to the left.

Figure 18:
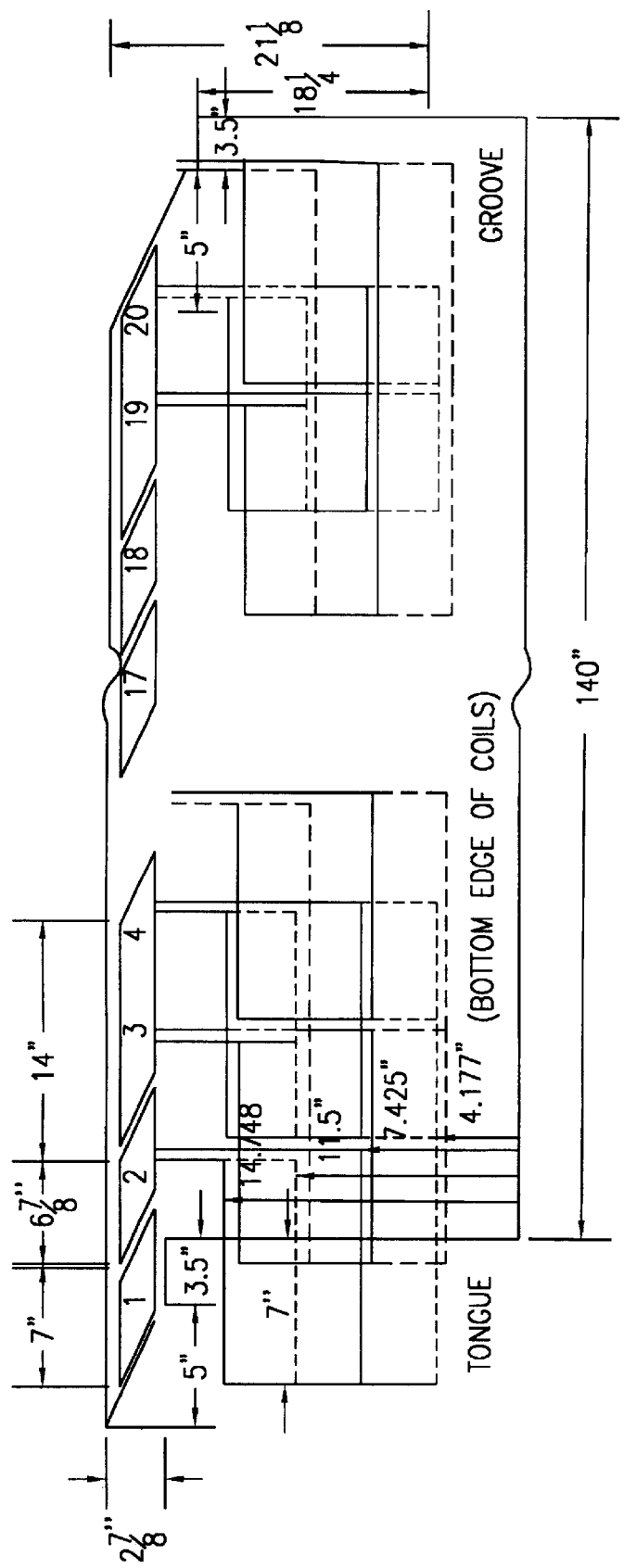
FIG. 18 is a schematic diagram of the track where sections of the rail fit together in a tongue and groove arrangement.

There are a number of ways to assemble the coils into the panels comprising the rail. FIG. 18 shows one such alternative, which allows the sections of the rail to fit together in a tongue and groove arrangement.

Brush mechanism is excited dramatically. When it is active, the bladder valves are open allowing the bladder to push the brushes against the collector plates. In the reverse direction scenario, it would be necessary to relieve the pressure on brush mechanisms A–A' and B–B' and pressurize the bladders on brush mechanisms C–C' and D–D' which are displaced axially down the track two collector bars in width. The new brush mechanism appropriate for this direction reversal should maintain the same excitation polarity as the first set.

Linear Induction Motor

Figure 38:
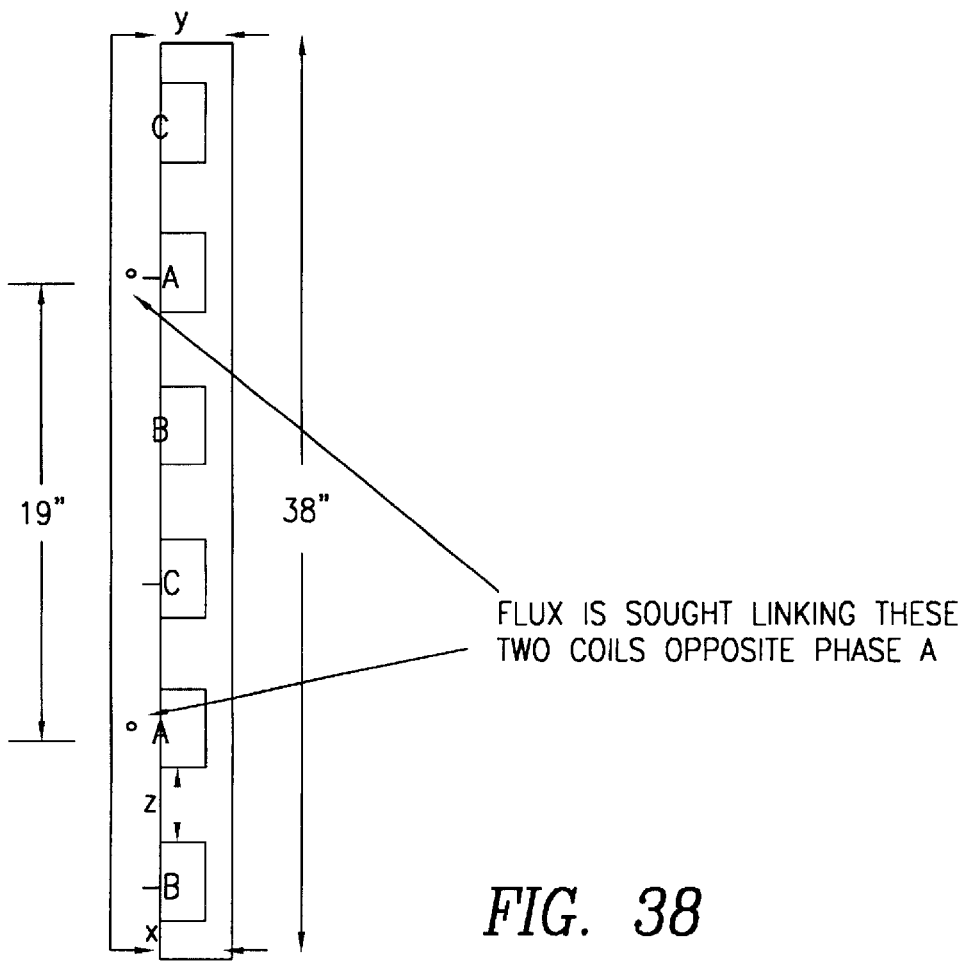
FIG. 38 is a schematic diagram of the LIM layout for a basic length unit of 38".

A Linear Induction Motor (LIM) may employed for thrust. It has the advantage of not requiring excitation of the track coils or brushes. The guideway coils remain passive. Shown in FIG. 38 is the LIM layout for a basic length unit of 38". Given the pole pitch layout of the co-.1s, this becomes the minimum length for the LIM. The slot depth x, the back iron depth y, and the tooth width become the three unknowns. The 19" coils are helpful to the lift, but provide a problem for the LIM—forcing the magnetic field to circulate through a long path. For the layout shown in FIG. 38, current density is maintained at 3.92 E06 A/m² for copper and 3.06 E06 A/m² for aluminum.

Figure 1:
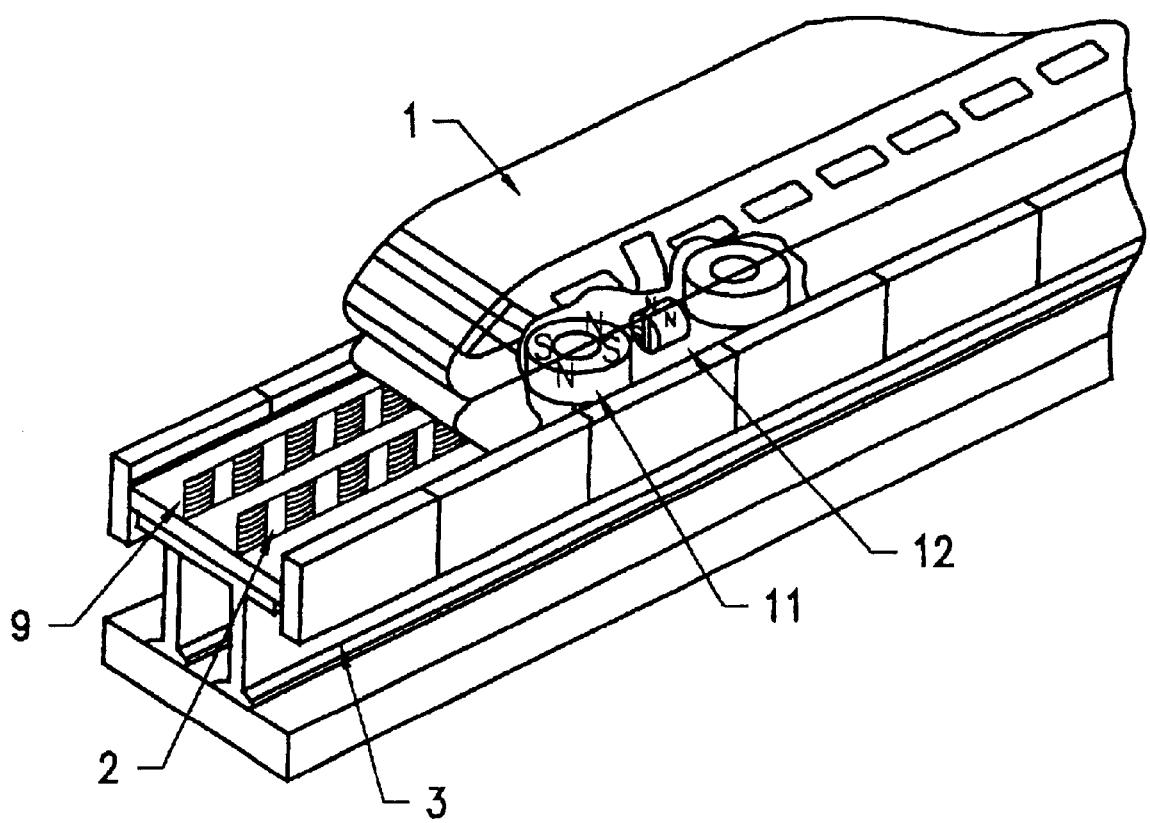
FIG. 1 is a partial perspective view of a MAGLEV vehicle as in the prior art, showing a, possible layout of the transverse and repulsive magnets straddling the vertical track structure.
Figure 2:
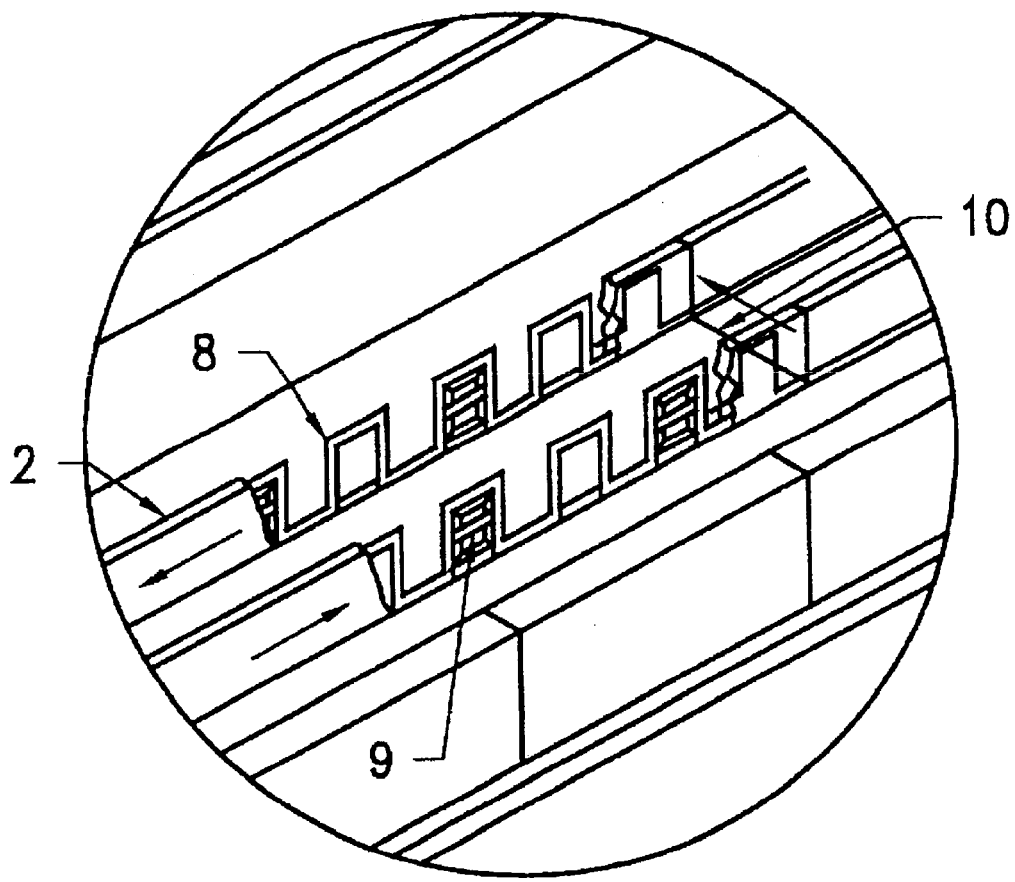
FIG. 2 is a partial, enlarged cross-section of the castellated track and null flux coils of FIG. 1, showing excitation near the end of one length of the track. A cross-over conductor is used to return the current over the adjacent track.
Figure 3:
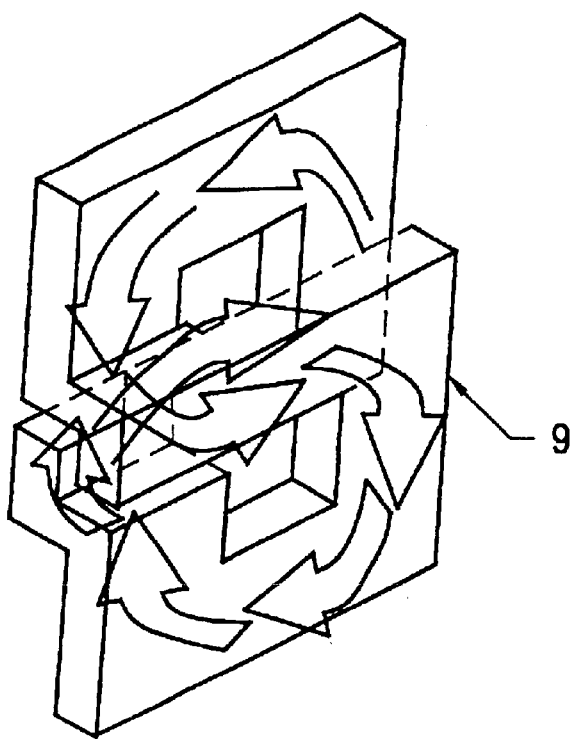
FIG. 3 is an enlarged, perspective view of a null flux coil as in the prior art. The current induced in a null flux coil is always such as to allow induced currents to constructively add over the horizontal central member of the figure.
Figure 4:
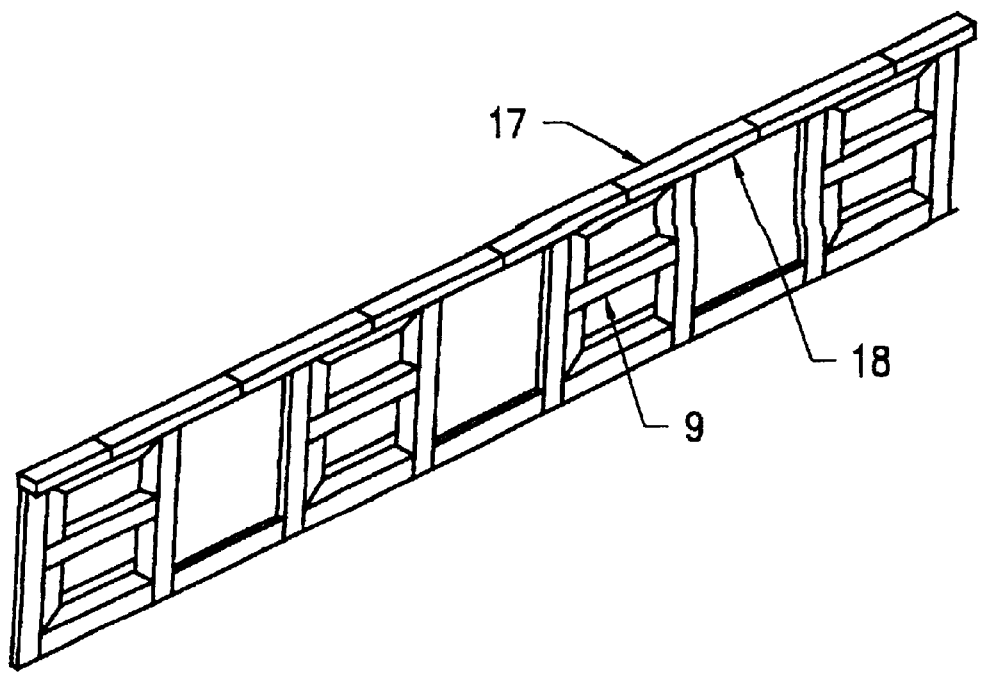
FIG. 4 is an enlarged, partial layout of the track structure appropriate for excitation of the track by brushes as in the prior art. Each of the T-shaped conductors is separated from its neighbor by a small spacer. These T-shaped conductors are used in place of castellated conductor segments.
Figure 22:
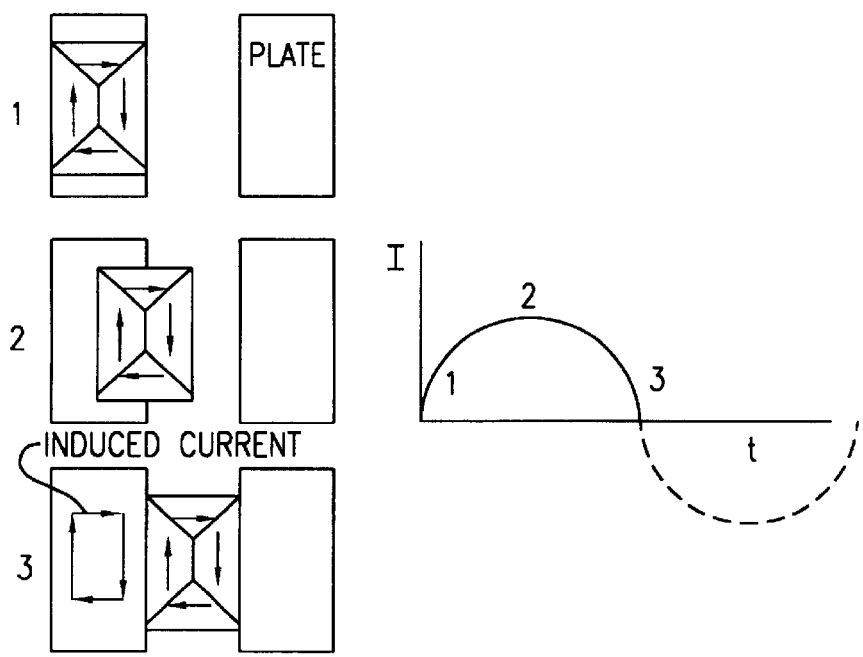
FIG. 22 is the schematic diagram of three positions of the vehicle coil translating past the ground based ladder rungs.

Linear induction and synchronous motors have been the favored approaches to linear propulsion in the Maglev community. Both require variable frequency power handling and usually rectifier-inverter power electronics, and are earmarked by a low power factor. The alternative embodiment proposed by the present invention is PLIM, Pulsed Linear Induction Motor. Advantages realized through PLIM are elimination of low power factor transfer, smaller end winding overhang, and simple electronics. Described in this application are various embodiments of this approach with rectangular guideway coils, and the tradeoffs to using full wave and half wave excitation pulses. The PLIM concept was introduced in June 1995 by Turman [1]. The original idea was to employ a simple ladder mechanism as the secondary of an induction motor. The rungs of the ladder were composed of aluminum plates. Plate shaped primary coils were affixed to the vehicle as suggested in FIG. 22. Shown drawn are three positions of the vehicle coil translating past the ground based ladder rungs. At position 1, the vehicle coil current is fired. It rises to a peak ideally when the coil half shadows the guideway plate. Finally in position 3 it falls completely to zero and must remain off until the coil completely shadows the next guideway plate. The specifications for the Sandia work were encouraging. The system was inverted, the plate was moving and the coils were stationary. Sandia's PLIM was able to accelerate a 30 lb plate of aluminum down a 4 m track to a speed of 15 m/s. The force peak was 18 kN (4,048 lbs). The weight of their 125 kW power supply was 86 lbs. These forces were produced using only a single plate. The inductance of the coil used was 3.74 mH, which is very small. A nominal period of 12 ms was employed. The theory is that as the source current is increasing, an induced plate current is generated which tries to oppose the increase as sketched in the last plate in FIG. 1. Since unlike currents repel, the fixed guideway plate pushes the coil away from it. The rise and fall of the current must ideally be completed before the coil begins to shadow the next plate. Every Maglev system has the problem of power transmission and power handling. Nearly every synchronous motor propulsion scheme keeps the power on the guideway, and inductively couples service power to the vehicle. The short stator systems usually employ a linear induction motor, such as the Birmingham Airport, HSST in Japan, and the LIM project in Korea. All require expensive power handling inverter equipment. Maglev systems have the task of realizing lift, guidance, and propulsion. The guideway plates employed by Sandia are not suitable to these three functions, but isolated coils are felicitous. To implement PLIM on a Maglev system the following conditions must be observed:

1. Reduce winding overhang.
2. Reduce power electronics.
3. Improve power factor.

Figure 23A:
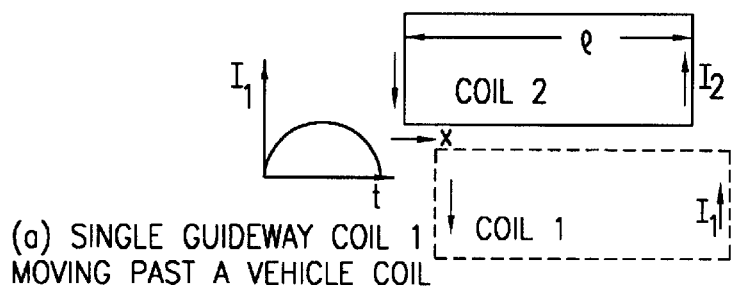
FIG. 23(a) is a schematic diagram of a single rectangular coil moving past its stationary ground based mate.

Shown in FIG. 23(*a*) is a single rectangular coil 1 moving past its stationary ground based mate. To a close approximation, the mutual inductance coupling between the two coils can be represented as $$M = M_0 \cos(kx) \quad (1)$$

where the wave number k=2π/(4l). Although the current is merely a function of time, it is convenient to think of its representation at a point in space, linking x and t as x=vt. Current is constrained to begin rising in coil 1 sinusoidally as $$I_1 = I_0 \sin(2kx) = I_0 \sin\left(\frac{\pi}{l} x\right) = I_0 \sin(2kvt) = I_0 \sin(\omega t) \quad (2)$$

The guideway coil 2 has a self inductance L and resistance R. The current in this shorted coil will be governed by $$L \frac{dI_2}{dt} + RI_2 + \frac{d(MI_1)}{dt} = 0 \quad (3)$$

The frequency q is maintained high enough to keep the current in an inductance limited regime, in which $LdI_2/dt \gg RI_2$. Thus the current in coil 2 is $$I_2 = -\frac{M_0 I_0}{L} \cos\left(\frac{\omega}{2} t\right) \sin(\omega t) = -\frac{M_0 I_0}{L} \cos(kx) \sin(2kx) \quad (4)$$

The coenergy of this two coil systems is $$W' = M_0 \cos(kx) I_1 I_2 \quad (5)$$

The x directed force on the vehicle coil 1 is $$F_x = \frac{dW'}{dx} \quad (6)$$
$$= -I_1 I_2 M_0 k \sin(kx)$$
$$= \frac{(M_0 I_0)^2 k}{L} \sin(kx) \cos(kx) \sin^2(2kx)$$

Of particular interest is the average force <Fx>, $$\langle F_x \rangle = \frac{1}{l} \int_0^l \frac{(M_0 I_0)^2 k}{2L} \sin^3(2kx) dx = \frac{(M_0 I_0)^2}{lL}\left[\frac{1}{3}\right] \quad (7)$$

The montage presented thus far is impractical. It is desirable for the propulsion current pulse to come from a capacitor discharging in resonance with the vehicle coil. Since it is not practical to carry multiple capacitors, the time constant τ (where τ=2π√LC of the pulse must be chosen sufficiently short. In fact it must be chosen so that a half wave occurs over the distance l, so that τ=2l/v. Consider the half wave pulse to be centered on the fixed coil 2 so that $$I_1 = I_0 \sin\left[\frac{\pi}{2\Delta}\left(x - \left(\frac{l}{2} - \Delta\right)\right)\right] \quad (8)$$

With the vehicle traveling at velocity v, the pulse would be initiated at x=l/2−vτ/4, so that Δ=vτ/4. Consistent with the assumption that excitation frequencies are maintained in the inductance limited regime would be a coil 2 induced current $$I_2 = -\frac{M I_1}{L} = -\frac{M_0 I_0}{L} \cos(kx) \sin\left[\frac{\pi}{2\Delta}\left(x - \left(\frac{l}{2} - \Delta\right)\right)\right] \quad (9)$$

In this context, it is understood that l/2−Δ<x<l/2+Δ. The coenergy W' and force are determined as before, and yield the result, $$F_x = \frac{dW'}{dx} \quad (10)$$
$$= -\frac{(M_0 I_0)^2 k}{2L} \sin(2kx) \sin^2\left[\frac{\pi}{2\Delta}\left(x - \left(\frac{l}{2} - \Delta\right)\right)\right]$$

The key parameter to be compared to (7) is the average force <Fx>, $$\langle F_x \rangle = \frac{1}{2\Delta} \int_{\frac{l}{2}-\Delta}^{\frac{l}{2}+\Delta} F(x) dx = \frac{(M_0 I_0)^2}{lL}\left[\frac{\frac{1}{8}\sin\left(\frac{\pi \Delta}{l}\right)}{\frac{\Delta}{l}\left(1 - \left(\frac{\Delta}{l}\right)^2\right)}\right] \quad (11)$$

The two bracketed terms in (7) and (11) are to be compared; their ratio dictates the loss realized through the use of a full wave current signal versus that of the half wave. This comparison follows after an examination of the full wave excitation.

Figure 24:
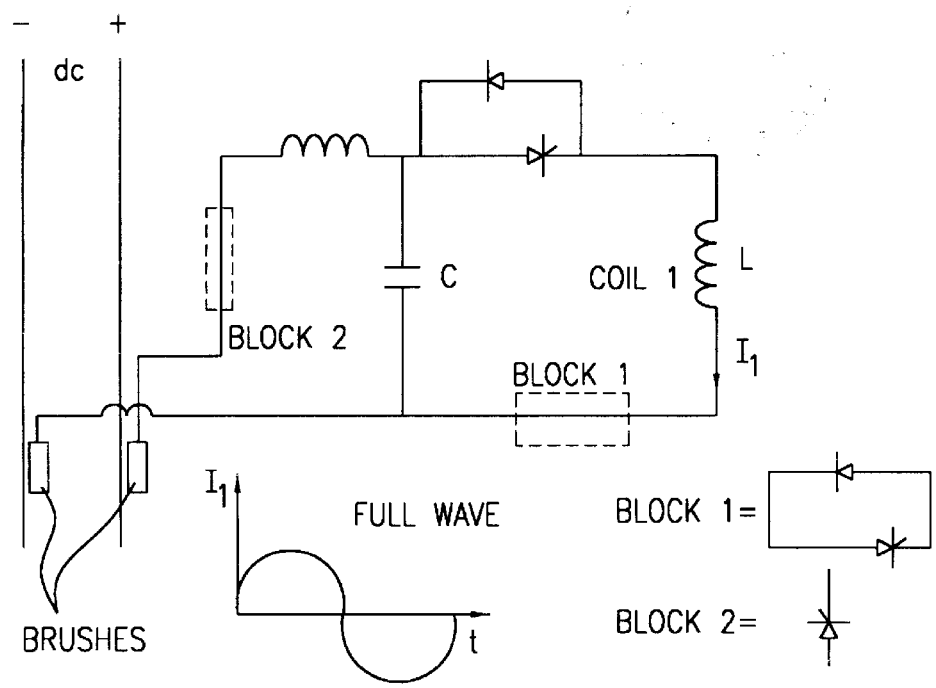
FIG. 24 is a diagram of the favored pulse circuit.
Figure 25:
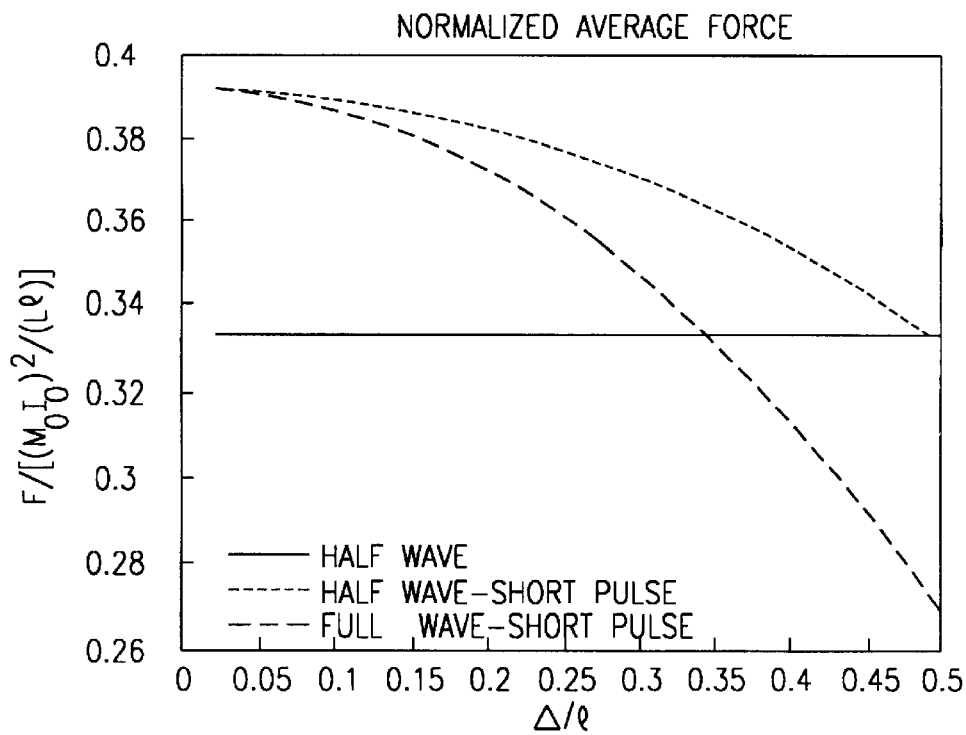
FIG. 25 is a graph showing a comparison of average forces of half wave short pulses and fall wave signals.

The two cases examined assumed that the excitation current was a half sine wave. Such an excitation poses many problems. It is desirable to continuously charge the capacitors directly from whatever dc voltage is on the rails. It is highly desirable that the pulse circuit be simple; the favored pulse circuit is that shown in FIG. 24. The full wave current pulse will be delivered when the thyristor is fired. A circuit delivering a half wave pulse would require at minimum another thyristor-diode pair in block 1 to control the backfire, and a thyristor in block 2 to shut off the charging when the capacitor is reverse charged, as suggested in the inset of FIG. 24. It is envisioned that one firing unit be placed on every coil. The natural question to be asked is "what price is payed if the current is a full wave and these expenses are eliminated.?". To perform this simulation, the current in coil 1 is assumed to carry the full wave current, and is always to be centered on the coil's midpoint, l/2, FIG. 24. Preferred circuit to drive current into coil 1. FIG. 25 showing a comparison of average forces of half wave short pulses and full wave signals.

$$I_1 = I_0 \sin\left[\frac{\pi}{\Delta}\left(x - \left(\frac{l}{2} - \Delta\right)\right)\right] \quad (12)$$

As with the previous example, its width (2Δ) will be less than coil's width l. The coil's resonant frequency will be chosen so that 2Δ=l at the highest vehicle speed. At all lower speeds, Δ<l/2. Assuming the time constant of the LC circuit in FIG. 24 is τ, when the vehicle is traveling at velocity v, the thyristor would be fired at a position x=l/2−vτ/2. The base mutual inductance continues to be represented by (1). Coil current $I_2$, instantaneous force, and average force follow as $$I_2 = -\frac{M I_1}{L} = -\frac{M_0 I_0}{L} \cos(kx) \sin\left[\frac{\pi}{\Delta}\left(x - \left(\frac{l}{2} - \Delta\right)\right)\right] \quad (13)$$

$$F_x = \frac{dW'}{dx} \quad (14)$$
$$= I_1 I_2 M_0 k \cos(kx)$$
$$= -\frac{(M_0 I_0)^2 k}{2L} \sin(2kx) \sin^2\left[\frac{\pi}{\Delta}\left(x - \left(\frac{l}{2} - \Delta\right)\right)\right]$$

$$\langle F_x \rangle = \frac{1}{2\Delta} \int_{\frac{l}{2}-\Delta}^{\frac{l}{2}+\Delta} F(x) dx = \frac{(M_0 I_0)^2}{lL}\left[\frac{\frac{1}{8}\sin\left(\frac{\pi \Delta}{l}\right)}{\frac{\Delta}{l}\left(1 - \left(\frac{\Delta}{2l}\right)^2\right)}\right] \quad (15)$$

Figure 23B:
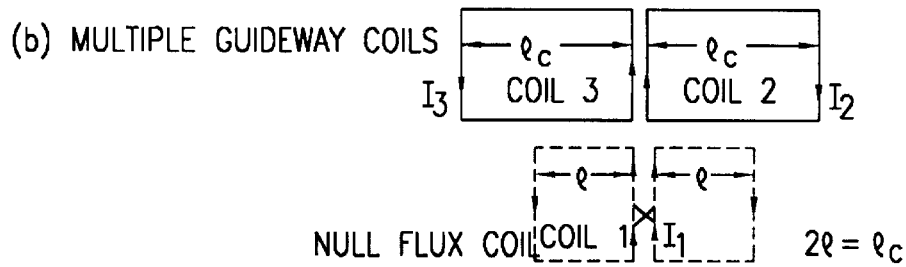
FIG. 23(b) is a schematic diagram of multiple guideway coils.

The bracketed terms in (7), (11), and (15) represent the difference between the half wave—short time constant, and full wave—short time constant options. The results plotted in FIG. 25, reveal that the short pulse excitations yield a higher average force than the pulse that matches the coil length width. This should be not too surprising since the shorter coil makes better use of the region where the mutual inductance is changing more rapidly. The above propulsion system works only if the guideway coils are spaced a distance l apart. A practical Maglev system will attempt to use the same coils for lift and guidance. Intermittent spaced coils are a disadvantage for delivering lift at low speeds. Continuous coils guarantee a more manageable propulsion, lift, and guidance system. FIG. 23(b) shows how to excite multiple guideway coils, the average forces being the same as (11) and (15). The resulting PLIM propulsion systems have the advantage of eliminating the entry and exit edge effects of a LIM system, and the excitation electronics are simpler.

There are several ways to collect power to a high speed moving vehicle. Three preferred methods are described hereinafter. The first method employs the self centering mechanism reluctance magnet to realize a tethered contact. The second employs a tin alloy that liquefies at 117° F. The third employs the same liquid contained on the vehicle in a bubble of ferrofluid.

Reluctance Magnet

Figure 34:
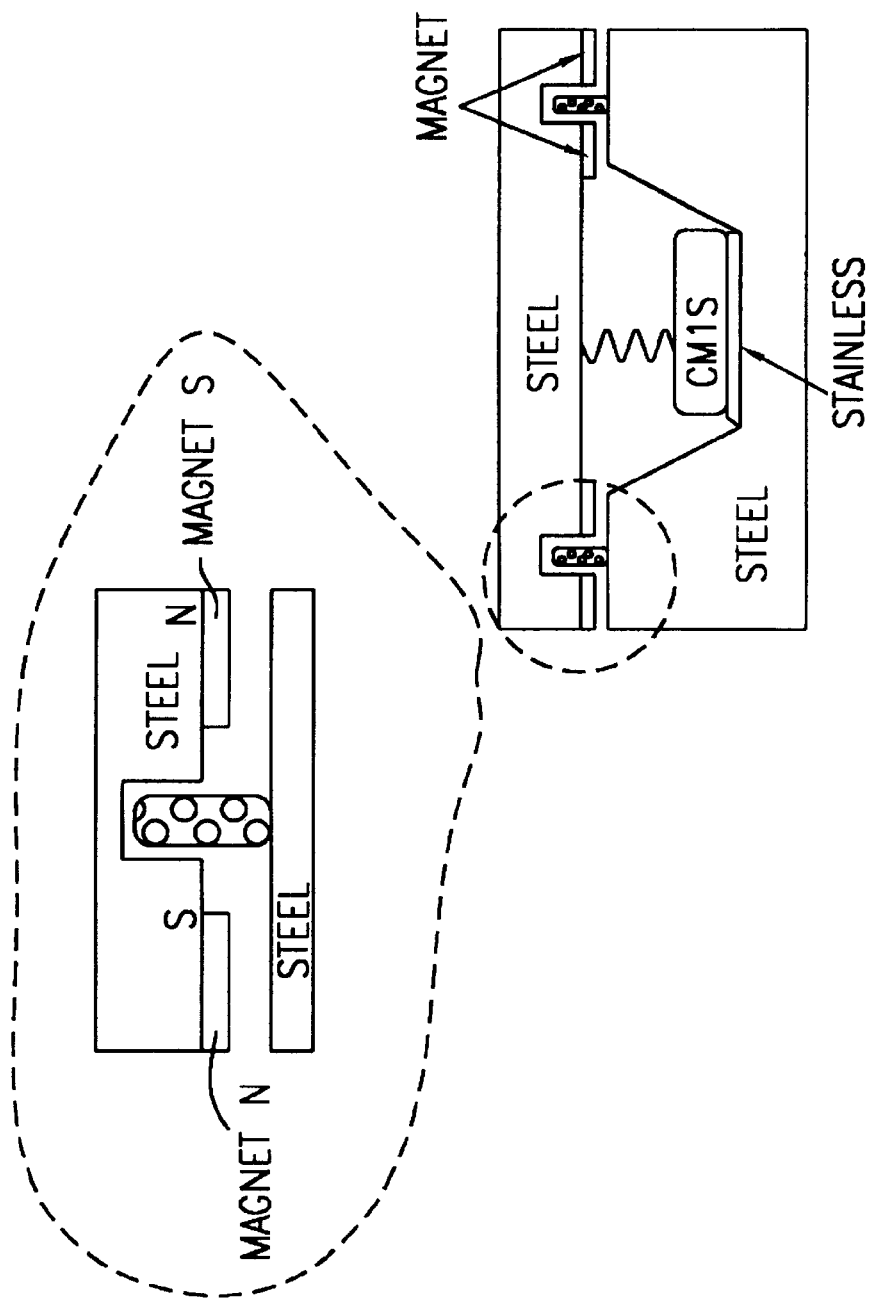
FIG. 34 is a schematic diagram of the test reluctance rig.
Figure 35:
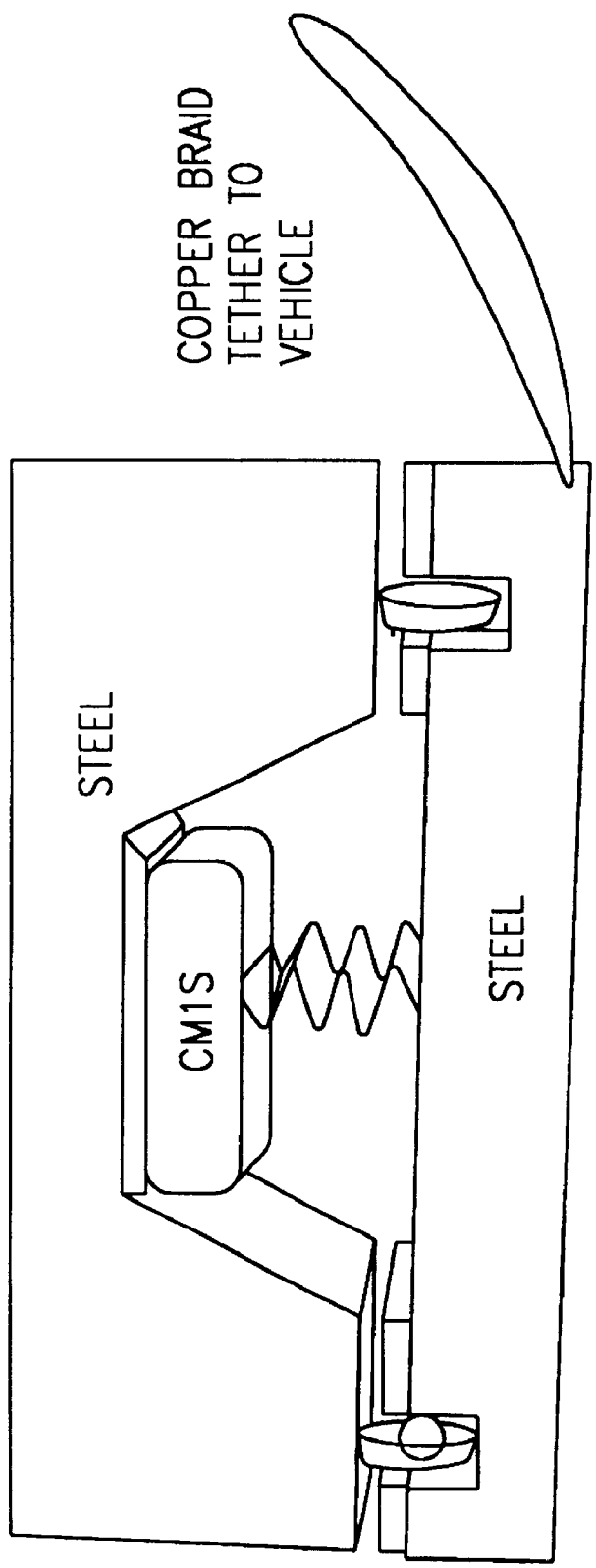
FIG. 35 is a schematic diagram showing the inverted reluctance brush with a cooper braid tether to the vehicle.

Shown in FIG. 34 is the test reluctance rig. The device is very stable to lateral movement. The magnets under each face are of opposite direction. Between the magnets is a wheel. Any wheel will work, but a nonconductor is preferred since it will not incur eddy current heating. Between the faces of the device is a morganite CMIS spring loaded brush. It resides on stainless steel plate at the bottom of the steel well. It may be objected that such a device will trap debris. There at least two solutions to that dilemma. The first is to simply invert the well so that the stainless in fact rides on a ridge. The second is to invert the entire structure as in FIG. 35. The magnets can easily be selected to insure that the device holds itself up against gravity. A mechanical attachment can also be employed. HSSI employs an active inductance sensor to maintain a fixed vertical gap for the entire vehicle. If this option is selected, the wheels can be eliminated.

Liquid Cerellow

Figure 36:
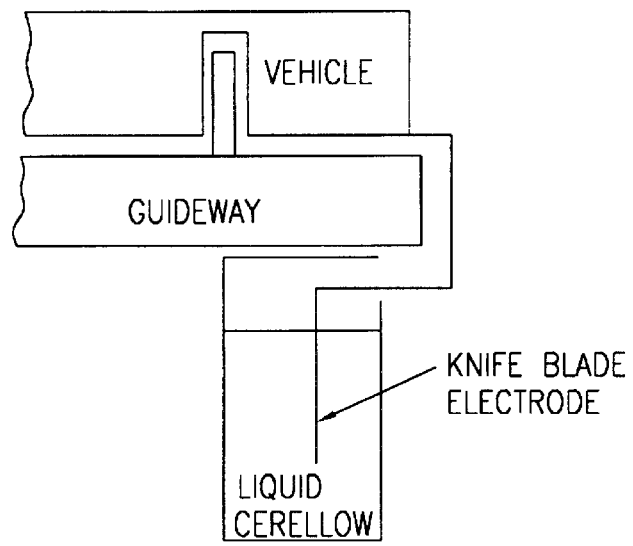
FIG. 36 is a schematic diagram showing a trough filled with a tin alloy Cerellow 117 which is kept heated through the use of heat tape along the track.

A tin alloy Cerellow 117 has the property of melting at 177° F. An alternative to a brush is to fill a trough with this material and keep it heated using heat tape along the track. The setup is shown in FIG. 36. The trough is positioned protectively under the track. A knife blade conductor passes moving through the trough realizes the power collection. The advantages include no maintenance. The disadvantages include insuring that the heat tape never fails. This means that 2–3 tapes should be employed for redundancy.

Ferrofluid

Figure 37:
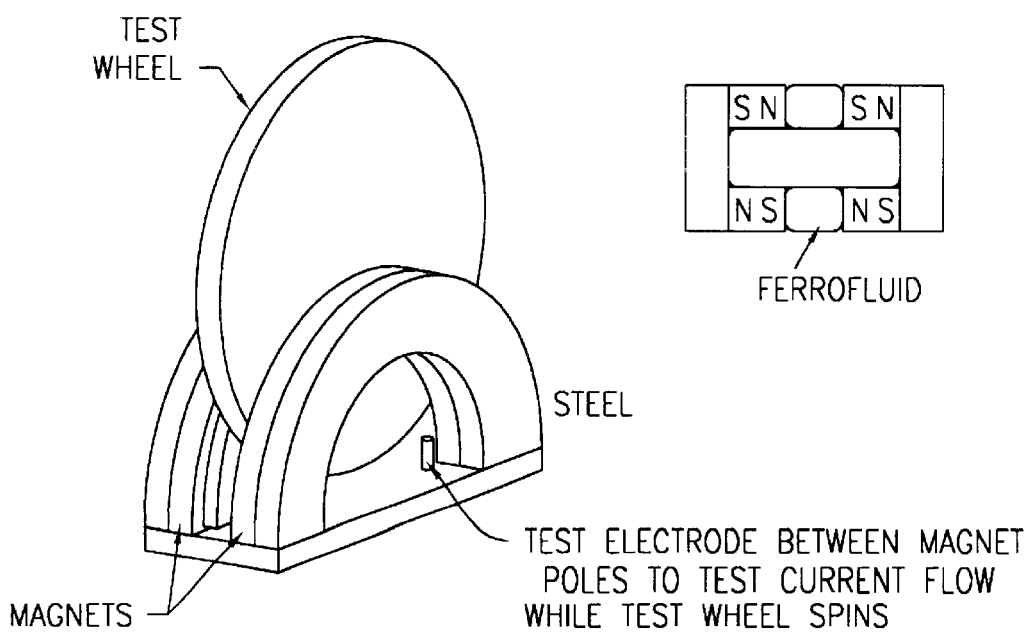
FIG. 37 is a schematic diagram showing ferrofluid seal to hold Cerellow 117.

An alternative to using the Cerellow on the guideway is to place it on the vehicle. It can be contained in a magnetic field as suggested in FIG. 37. A ferrofluid is a fluid with extremely fine ferromagnetic particles suspended in the fluid. They have been used in industry for 20 years to realize seals up to $10^{-9}$ Torr with a leakage rate I $0^{-11}$ scc/sec. Their temperature range (uncooled) is 20 to 200° F. The ferrofluid is sucked into the high field region. The Cerellow sits in the magnetic well. A test rig is suggested wherein a wheel is spun while current is passed down its shaft and into the Cerrelow through the electrode shown.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims. In addition to the disclosure of the inventions provided herein, several additional references may be of interest to those of ordinary skill and useful for additional background and information of relevance. These references include:

1. B. N. Turman, B. M. Marder, G. J. Rohwein, D. P. Aeschliman, J. B. Kelley, M Cowan, R. M. Zimmerman, "The Pulsed Linear Induction Motor Concept for High Speed Trains", Sandia Report, SAND-1268, UC-1500, June 1995.
2. U. Henning, "Long Stator Propulsion System of the Transrapid Berlin-Hamburg", 15th International Conference on Magnetically Levitated Systems and Linear Drives—Maglev 98, Apr. 12–15, 1998, Mt Fuji, Japan, pp. 274–279.
3. M. Andriollo, G. Martenelli, A. Morini, A. Tortella, "Electromagnetic Optimization of EMS-Maglev Systems", *IEEE Trans. Magnetics*, vol. 34, no.4, July, 1998, pp. 2090–2092.
4. T. Seki, "The development of HSST-L", 14th International Maglev Conference, Bremen, Germany, November 1995, ISBN 3-8007-2155-4, pp. 51–55.
5. I. K. Kim, M. H. Yoo, K. H. Han, G. S. Park, H. S. Bae, "Status of the Maglev development in Korea", 15th International Conference on Magnetically Levitated Systems and Linear Drives—Maglev 98, Apr. 12–15, 1998, Mt Fuji, Japan, pp. 34–38.
6. J. Kitano, S. Yokoyama, "PWM Converter and Inverter System for Yamanashi Test Line", 14th International Maglev Conference, Bremen.

We claim:

1. A system for transportation using magnetic levitation, comprising:
    (a) a vehicle;
    (b) a track, said track comprising at least a first set of coils and a second set of coils, said first set of coils being phase shifted from said second set of coils;
    (c) at least two sets of brushes and at least two sets of collector plates, said brushes and said collector plates are configured to deliver current to said two sets of coils; and,
    (d) a magnetic field source, said source mounted to said vehicle, wherein said brushes are positive when delivering current to a first set of said at least two sets of collector plates and are negative when delivering current to a second set of said at least two sets of collector plates, wherein a first set of said brushes leads said magnetic field source and a second set of said brushes lags said magnetic field source, and wherein said two sets of coils and said magnetic source interact to provide a propulsion force for said vehicle when current is delivered to said two sets of coils through said two sets of brushes and said two sets of collector plates, said magnetic source and said two sets of coils further interacting so as to induce forces for levitation and guidance of said vehicle.

2. A system as claimed in claim 1, said at least two sets of coils comprising individual coils, wherein each of said individual coils of said at least two sets of coils further comprises alternating normal coils and crossed coils, each of said individual coils further comprises at least two leads, and wherein for each of said normal coils a first of said two leads is connected to a collector plate of said first set of collector plates and a second of said two leads is connected to a collector plate of said second set of collector plates, and for each of said crossed coils said first lead is connected to a collector plate of said second set of collector plates and said second lead is connected to a collector plate of said first set of collector plates.

3. A system as claimed in claim 2, wherein said magnetic source comprises superconductive material.

4. A system as claimed in claim 2, wherein said magnetic source comprises magnets affixed to a back iron, said back iron being affixed to said vehicle.

5. A system as claimed in claim 2, wherein said magnetic source comprises at least one set of magnets vertically stacked in two facing planes.

6. A system as claimed in claim 5, wherein said two facing planes comprise a first plane and a second plane, said two planes flanking said individual coils when said vehicle moves over said track.

7. A system as claimed in claim 6, in which said magnets of said first plane and said magnets of said second plane have magnetic poles, the magnetic poles of the magnets in said first plane facing the magnetic poles of opposite polarity of said magnets in said second plane.

8. A system as claimed in claim 5, in which said magnets have magnetic poles, the magnetic pole faces of adjacent magnets alternating in magnetic polarity.

9. A system as claimed in claim 2, wherein said vehicle further comprises vertical wheels.

10. A system as claimed in claim 9, wherein said vertical wheels are retractable.

11. A system as claimed in claim 2, further comprising an additional set of brushes, said additional set of brushes and said two sets of coils are configured to provide active lift to said vehicle.

12. A system as claimed in claim 11, wherein said magnetic source comprises superconductive material.

13. A system as claimed in claim 11, wherein said magnetic source comprises magnets affixed to a back iron, said back iron being affixed to said vehicle.

14. A system as claimed in claim 11, wherein said magnetic source comprises at least one set of magnets vertically stacked in two facing planes.

15. A system as claimed in claim 14, wherein said two facing planes comprise a first plane and a second plane, said two planes flanking said individual coils when said vehicle moves over said track.

16. A system as claimed in claim 15, in which said magnets of said first plane and said magnets of said second plane have magnetic poles, the magnetic poles of the magnets in said first plane facing the magnetic poles of opposite polarity of said magnets in said second plane.

17. A system as claimed in claim 14, in which said magnets have magnetic poles, the magnetic pole faces of adjacent magnets alternating in magnetic polarity.

18. A system as claimed in claim 11, wherein said vehicle further comprises vertical wheels.

19. A system as claimed in claim 18, wherein said vertical wheels are retractable.

20. A system as claimed in claim 1, wherein said first set of coils is 90° phase shifted from said second set of coils.

* * * * *